United States Patent
Kim et al.

(10) Patent No.: US 12,237,536 B2
(45) Date of Patent: Feb. 25, 2025

(54) SEPARATOR FOR LITHIUM SECONDARY BATTERY AND LITHIUM SECONDARY BATTERY COMPRISING SAME

(71) Applicant: Samsung SDI Co., Ltd., Yongin-si (KR)

(72) Inventors: Yongkyoung Kim, Yongin-si (KR); Gain Kim, Yongin-si (KR); Jungyoon Lee, Yongin-si (KR); Yeonjoo Choi, Yongin-si (KR); Yangseob Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 702 days.

(21) Appl. No.: 17/296,516

(22) PCT Filed: Aug. 9, 2019

(86) PCT No.: PCT/KR2019/010130
§ 371 (c)(1),
(2) Date: May 24, 2021

(87) PCT Pub. No.: WO2020/138628
PCT Pub. Date: Jul. 2, 2020

(65) Prior Publication Data
US 2022/0029244 A1    Jan. 27, 2022

(30) Foreign Application Priority Data

Dec. 28, 2018    (KR) .................. 10-2018-0173101

(51) Int. Cl.
*H01M 50/449* (2021.01)
*C08K 3/013* (2018.01)
(Continued)

(52) U.S. Cl.
CPC ............ *H01M 50/449* (2021.01); *C08K 3/013* (2018.01); *C08L 25/14* (2013.01); *C08L 33/02* (2013.01);
(Continued)

(58) Field of Classification Search
CPC ............. H01M 50/411; H01M 50/443; H01M 50/446; H01M 50/449; C08K 3/013; C08L 25/14; C08L 33/02; C08L 33/26
(Continued)

(56) References Cited

U.S. PATENT DOCUMENTS

2006/0263693 A1    11/2006 Kim et al.
2010/0233409 A1    9/2010 Kamiya et al.
(Continued)

FOREIGN PATENT DOCUMENTS

CN    1855584 A    11/2006
CN    102770984 A    11/2012
(Continued)

OTHER PUBLICATIONS

US Office Action dated May 2, 2023, issued in U.S. Appl. No. 17/414,043, 19 pages.
(Continued)

*Primary Examiner* — James M Erwin
(74) *Attorney, Agent, or Firm* — Lewis Roca Rothgerber Christie LLP

(57) ABSTRACT

The present invention relates to a separator for a lithium secondary battery, and a lithium secondary battery including same. The separator includes a porous substrate, and a coating layer on at least one surface of the porous substrate, wherein the coating layer includes a heat-resistant binder including a (meth)acrylic copolymer including a first structural unit derived from (meth)acrylamide, and a second structural unit including at least one of a structural unit
(Continued)

derived from (meth)acrylic acid or (meth)acrylate, and a structural unit derived from (meth)acrylamidosulfonic acid or a salt; an adhesive binder having a core-shell structure; and inorganic particles, wherein the adhesive binder has an average particle diameter of 0.2 μm to 1.0 μm, and the inorganic particles have an average particle diameter of 0.2 μm to 1.0 μm.

15 Claims, 9 Drawing Sheets

(51) Int. Cl.
  *C08L 25/14* (2006.01)
  *C08L 33/02* (2006.01)
  *C08L 33/08* (2006.01)
  *C08L 33/26* (2006.01)
  *H01M 50/411* (2021.01)
  *H01M 50/443* (2021.01)
  *H01M 50/446* (2021.01)

(52) U.S. Cl.
  CPC .............. *C08L 33/08* (2013.01); *C08L 33/26* (2013.01); *H01M 50/411* (2021.01); *H01M 50/443* (2021.01); *H01M 50/446* (2021.01)

(58) Field of Classification Search
  USPC .......................................................... 429/144
  See application file for complete search history.

(56) References Cited

U.S. PATENT DOCUMENTS

| | | |
|---|---|---|
| 2011/0318630 A1 | 12/2011 | Wakizaka et al. |
| 2012/0115036 A1 | 5/2012 | Lee et al. |
| 2013/0017429 A1 | 1/2013 | Ha et al. |
| 2013/0224555 A1 | 8/2013 | Hong et al. |
| 2013/0252066 A1 | 9/2013 | Yeou et al. |
| 2013/0302661 A1 | 11/2013 | Kim et al. |
| 2013/0323569 A1 | 12/2013 | Yeou et al. |
| 2013/0330590 A1 | 12/2013 | Toyoda |
| 2014/0050965 A1 | 2/2014 | Ha et al. |
| 2014/0120402 A1 | 5/2014 | Yu et al. |
| 2014/0186680 A1 | 7/2014 | Kim et al. |
| 2014/0272532 A1 | 9/2014 | Park et al. |
| 2015/0010815 A1 | 1/2015 | Chung et al. |
| 2015/0030933 A1 | 1/2015 | Goetzen et al. |
| 2015/0050554 A1 | 2/2015 | Fukumine et al. |
| 2015/0111086 A1 | 4/2015 | Arnold et al. |
| 2016/0013465 A1 | 1/2016 | Akiike |
| 2016/0141581 A1* | 5/2016 | Sasaki ............... H01M 10/0525 429/144 |
| 2016/0149184 A1 | 5/2016 | Nam et al. |
| 2016/0149190 A1 | 5/2016 | Fukuchi |
| 2016/0344007 A1* | 11/2016 | Toyoda ............... H01M 50/403 |
| 2017/0162848 A1 | 6/2017 | Pan et al. |
| 2017/0200932 A1* | 7/2017 | Sasaki ................. H01M 50/443 |
| 2017/0301903 A1 | 10/2017 | Choi et al. |
| 2017/0326863 A1 | 11/2017 | Wang et al. |
| 2017/0338461 A1 | 11/2017 | Seo et al. |
| 2018/0053963 A1 | 2/2018 | Tanaka |
| 2018/0114966 A1 | 4/2018 | Yasuda et al. |
| 2018/0337381 A1 | 11/2018 | Seo et al. |
| 2018/0351149 A1 | 12/2018 | Akiike et al. |
| 2018/0358649 A1 | 12/2018 | Inoue et al. |
| 2019/0013504 A1 | 1/2019 | Choi et al. |
| 2019/0106521 A1 | 4/2019 | Takamatsu |
| 2019/0245183 A1 | 8/2019 | Jeong et al. |
| 2020/0388808 A1 | 12/2020 | Choi et al. |
| 2021/0226299 A1 | 7/2021 | Choi et al. |
| 2021/0234235 A1 | 7/2021 | Kang et al. |
| 2022/0013859 A1 | 1/2022 | Kim et al. |
| 2022/0029244 A1 | 1/2022 | Kim et al. |
| 2022/0037739 A1 | 2/2022 | Lee et al. |
| 2022/0037741 A1 | 2/2022 | Lee et al. |
| 2022/0102810 A1 | 3/2022 | Kim et al. |

FOREIGN PATENT DOCUMENTS

| | | |
|---|---|---|
| CN | 102893427 A | 1/2013 |
| CN | 103390740 A | 11/2013 |
| CN | 103718336 A | 4/2014 |
| CN | 103857732 A | 6/2014 |
| CN | 104277746 A | 1/2015 |
| CN | 104521031 A | 4/2015 |
| CN | 105324868 A | 2/2016 |
| CN | 105378989 A | 3/2016 |
| CN | 105440770 A | 3/2016 |
| CN | 105531854 A | 4/2016 |
| CN | 105934838 A | 9/2016 |
| CN | 106328865 A | 1/2017 |
| CN | 106463675 A | 2/2017 |
| CN | 107394087 A | 11/2017 |
| CN | 107851765 A | 3/2018 |
| CN | 108155328 A | 6/2018 |
| CN | 108305970 A | 7/2018 |
| CN | 108463904 A | 8/2018 |
| CN | 108666499 A | 10/2018 |
| CN | 108963148 A | 12/2018 |
| CN | 109037564 A | 12/2018 |
| CN | 109075291 A | 12/2018 |
| CN | 109103397 A | 12/2018 |
| CN | 113228397 A | 8/2021 |
| EP | 2549564 A2 | 1/2013 |
| EP | 2779277 A1 | 9/2014 |
| EP | 3246969 A1 | 11/2017 |
| EP | 3588636 A1 | 1/2020 |
| EP | 3748730 A1 | 12/2020 |
| EP | 3855529 A1 | 7/2021 |
| EP | 3902027 A1 | 10/2021 |
| EP | 3902028 A1 | 10/2021 |
| EP | 3905381 A | 11/2021 |
| EP | 3907781 A1 | 11/2021 |
| JP | 03-175023 A | 7/1991 |
| JP | 2011-832 A | 1/2011 |
| JP | 2011-5670 A | 1/2011 |
| JP | 2014-225410 A | 12/2014 |
| JP | 2014-229406 A | 12/2014 |
| JP | 2015-88253 A | 5/2015 |
| JP | 2015-088253 A | 5/2015 |
| JP | 2016-105398 A | 6/2016 |
| JP | 2017-050149 A | 3/2017 |
| JP | 2017-103206 A | 6/2017 |
| JP | 2018-26266 A | 2/2018 |
| JP | 2018-34496 A | 3/2018 |
| JP | 2018-092701 A | 6/2018 |
| JP | 2019-57486 A | 4/2019 |
| KR | 10-2010-0094062 A | 8/2010 |
| KR | 10-2011-0097715 A | 8/2011 |
| KR | 10-2011-0104791 A | 9/2011 |
| KR | 10-2012-0093772 A | 8/2012 |
| KR | 10-2012-0097238 A | 9/2012 |
| KR | 10-1254693 B1 | 4/2013 |
| KR | 10-2014-0044757 A | 4/2014 |
| KR | 10-2014-0116415 A | 10/2014 |
| KR | 10-2014-0147742 A | 12/2014 |
| KR | 10-2015-0034825 A | 4/2015 |
| KR | 2015-0037394 A | 4/2015 |
| KR | 10-2016-0033692 A | 3/2016 |
| KR | 10-2016-0061165 A | 5/2016 |
| KR | 10-2016-0109669 A | 9/2016 |
| KR | 10-2016-0118979 A | 10/2016 |
| KR | 10-2017-0003020 A | 1/2017 |
| KR | 10-2017-0045438 A | 4/2017 |
| KR | 10-2017-0084597 A | 7/2017 |
| KR | 10-2017-0095024 A | 8/2017 |
| KR | 10-2017-0129645 A | 11/2017 |
| KR | 10-2018-0003177 A | 1/2018 |
| KR | 10-1868240 B1 | 6/2018 |
| KR | 10-2018-0099560 A | 9/2018 |
| KR | 10-2018-0099561 A | 9/2018 |
| KR | 10-2018-0109740 A | 10/2018 |

(56) References Cited

FOREIGN PATENT DOCUMENTS

| WO | WO 2009/060787 A1 | 5/2009 |
| --- | --- | --- |
| WO | WO 2010/074205 A1 | 7/2010 |
| WO | 2014/054919 A1 | 4/2014 |
| WO | 2014/136799 A1 | 9/2014 |
| WO | 2015/008626 A1 | 1/2015 |
| WO | 2015/076571 A1 | 5/2015 |
| WO | 2015/122322 A1 | 8/2015 |
| WO | 2016/157899 A1 | 10/2016 |
| WO | WO 2018/147714 A1 | 8/2018 |
| WO | WO 2018/155345 A1 | 8/2018 |

OTHER PUBLICATIONS

EPO Third Party Observations dated Sep. 21, 2021, issued in European Patent Application No. 19861770.6 (20 pages).
Chinese Notice of Allowance, with English translation, dated Jan. 13, 2023, issued in Chinese Patent Application No. 201980055198.4 (8 pages).
US Office Action dated Nov. 21, 2023, issued in U.S. Appl. No. 17/414,043 (19 pages).
Chinese Office Action, with English translation, dated Sep. 19, 2023, issued in Chinese Patent Application No. 201980087908.1 (19 pages).
Chinese Notice of Allowance, with English translation, dated Sep. 27, 2023, issued in Chinese Patent Application No. 201980085835.2 (6 pages).
EPO Extended European Search Report dated May 17, 2022, issued in European Patent Application No. 19861770.6 (10 pages).
Notification of Third Party Observation dated Jun. 6, 2022, 15 pages.
Japanese Office Action dated Jun. 20, 2022, issued in Japanese Patent Application No. 2021-513921 (6 pages).
International Search Report for corresponding Application No. PCT/KR2019/008767 dated Oct. 25, 2019, 4pp.
International Search Report for corresponding Application No. PCT/KR2019/009085 dated Oct. 30, 2019, 4pp.
International Search Report for corresponding Application No. PCT/KR2019/010128 dated Nov. 26, 2019, 6pp.
International Search Report for corresponding Application No. PCT/KR2019/010130 dated Nov. 26, 2019, 4pp.
EPO Extended European Search Report dated Aug. 3, 2022, issued in European Patent Application No. 19898125.0 (11 pages).
Chinese Office Action, with English translation, dated Aug. 3, 2022, issued in Chinese Patent Application No. 201980055198.4 (20 pages).
Ghosh, Prof. Premamoy, "Polymer Science Fundamentals of Polymer Science: Molecular Weights of Polymers," Sep. 2006, XP055608363, 22 pages.
Chinese Office Action for Chinese Application No. 201980084182.6 dated May 31, 2023, 19 pages.
Chinese Office Action for CN Application No. 201980082244.X dated Sep. 26, 2022, 14 pages.
Chinese Office Action for CN Application No. 201980084182.6 dated Sep. 29, 2022, 16 pages.
Chinese Office Action for CN Application No. 201980085911.X dated Oct. 8, 2022, 21 pages.
Chinese Office Action for CN Application No. 201980087928.9 dated Oct. 9, 2022, 21 pages.
Chinese Office Action, with English translation, dated Apr. 20, 2023, issued in Chinese Patent Application No. CN 201980082244.X (13 pages).
Chinese Office Action, with English translation, dated Apr. 3, 2023, issued in Chinese Patent Application No. 201980087928.9 (28 pages).
Chinese Office Action, with English translation, dated Mar. 8, 2023, issued in Chinese Patent Application No. 201980085911.X (20 pages).
Chinese Office Action, with English translation, dated Jun. 22, 2023, issued in Chinese Patent Application No. 201980087908.1 (23 pages).
Chinese Decision of Rejection, with English translation, dated Jul. 1, 2023, issued in Chinese Patent Application No. 201980085911.X (21 pages).
Chinese Office Action, with English translation, dated Aug. 12, 2023, issued in Chinese Patent Application No. 201980082244.X (13 pages).
EPO Extended European Search Report dated Dec. 20, 2022, issued in European Patent Application No. 19902175.9 (8 pages).
European Search Report for EP 19898811.5 dated Aug. 3, 2022, 11 pages.
European Search Report for EP 19902841.6 dated Aug. 12, 2022, 12 pages.
European Search Report for EP 19906911.3 dated Oct. 14, 2022, 7 pages.
Fedelich, "Application Handbook Thermal Analysis of Polymers Selected Applications Thermal Analysis", Jan. 1, 2013, XP055608279, Retrieved from the Internet: URL: https://www.mt.com/dam/LabDiv/guides-glen/ta-polymer/TA_Polymers_Selected_Apps_EN.pdf [retrieved on Jul. 24, 2019], 40 pgs.
Ghosh, "Polymer Science Fundamentals of Polymer Science Molecular Weights of Polymers Contents Introduction Concept of Average Molecular Weight No. Average Molecular Weight Membrane Osmometry Weight Average Molecular Weight Assessment of Shape of Polymer Molecules Viscosity Average Molecular Weight Gener", Sep. 21, 2006, XP055608363, 22 pgs.
International Search Report for Application No. PCT/KR2019/009945 dated Nov. 20, 2019, 4pp.
International Search Report for Application No. PCT/KR2019/010129 dated Nov. 28, 2019, 4pp.
International Search Report for Application No. PCT/KR2019/010131 dated Nov. 28, 2019, 4 pp.
International Search Report for corresponding Application No. PCT/KR2019/009136 dated Oct. 30, 2019, 4pp.
Limparyoon, Nattawut, et al., "Acrylamide/2-acrylamido-2-methylpropane sulfonic acid and associated sodium salt superabsorbent copolymer nanocomposites with mica as fire retardants", Polymer Degradation and Stability, vol. 96, No. 6, pp. 1054-1063, 2011.
"Derive." New Oxford American Dictionary. Eds. Stevenson, Angus, and Christine A. Lindberg. : Oxford University Press, 2011. Oxford Reference. Date Accessed Aug. 10, 2023, https://www.oxfordreference.com/view/10.1093/acref/9780195392883.001.0001/ m_en_us1239627. (Year: 2011).
US Final Office Action dated Aug. 18, 2023, issued in U.S. Appl. No. 17/414,043 (19 pages).
US Final Office Action dated Sep. 25, 2023, issued in U.S. Appl. No. 17/296,501 (26 pages).
Chinese Office Action, with English translation, dated Sep. 20, 2022, issued in Chinese Patent Application No. 201980083245.6 (28 pages).
Chinese Office Action, with English translation, dated Sep. 30, 2022, issued in corresponding Chinese Patent Application No. 201980085835.2 (15 pages).
EPO Extended European Search Report dated Oct. 14, 2022, issued in corresponding European Patent Application No. 19904249.0 (9 pages).
Chinese Office Action, with English translation, dated Oct. 24, 2022, issued in Chinese Patent Application No. 201980087908.1 (18 pages).
EPO Extended European Search Report dated Dec. 6, 2022, issued in European Patent Application No. 19910153.6 (9 pages).
Chinese Office Action, with English translation, dated Apr. 13, 2023, issued in Chinese Patent Application No. 201980083245.6 (6 pages).
Chinese Office Action, with English translation, dated Apr. 23, 2023, issued in Chinese Patent Application No. 201980085835.2 (15 pages).
US Office Action dated Jun. 14, 2023, issued in U.S. Appl. No. 17/296,501 (29 pages).

(56) References Cited

OTHER PUBLICATIONS

Machine translation of Japanese Patent Publication No. 2018-026266, published Feb. 15, 2018. (Year: 2018).
US Office Action dated Dec. 14, 2023, issued in U.S. Appl. No. 17/273,238 (19 pages).
US Office Action dated Jan. 31, 2024, issued in U.S. Appl. No. 17/296,501 (26 pages).
Final Rejection for U.S. Appl. No. 17/296,501 dated May 14, 2024, 30 pages.
Machine translation of WO 2015/122322, 27 pages.
Final Rejection for U.S. Appl. No. 17/273,238 dated May 31, 2024, 21 pages.
Machine translation of WIPO Patent Publication 2015-008626, published Jan. 22, 2015. (Year: 2015).
US Office Action dated Aug. 6, 2024, issued in U.S. Appl. No. 17/296,501 (30 pages).
US Office Action dated Sep. 24, 2024, issued in U.S. Appl. No. 17/273,238 (17 pages).

\* cited by examiner

Comparative Example 1      Example 3

SEPARATOR FOR LITHIUM SECONDARY BATTERY AND LITHIUM SECONDARY BATTERY COMPRISING SAME

CROSS-REFERENCE TO RELATED APPLICATIONS

This application is a U.S. National Phase Patent Application of International Application Number PCT/KR2019/010130, filed on Aug. 9, 2019, which claims priority to Korean Patent Application Number 10-2018-0173101, filed on Dec. 28, 2018, the entire content of both of which is incorporated herein by reference.

TECHNICAL FIELD

A separator for a lithium secondary battery and a lithium secondary battery including the same are disclosed.

BACKGROUND ART

A separator for an electrochemical battery is an intermediate film that separates a positive electrode and a negative electrode in a battery, and maintains ion conductivity continuously to enable charge and discharge of a battery. When a battery is exposed to a high temperature environment due to abnormal behavior, a separator may be mechanically shrinks or is damaged due to melting characteristics at a low temperature. Herein, the positive and negative electrodes contact each other and may cause an explosion of the battery. In order to overcome this problem, technology of suppressing shrinkage of a separator and ensuring stability of a battery is required.

In this regard, a method of increasing heat resistance of the separator by mixing inorganic particles having large heat resistance with an organic binder having adhesion and coating them on the separator has been known. However, this conventional method may not sufficiently securing desired adhesive strength and in addition, is difficult to universally apply to separators having various sizes and shapes.

DISCLOSURE

Technical Problem

A separator for a lithium secondary battery having high heat resistance and strong adhesive strength, and a lithium secondary battery having improved cycle-life characteristics by including the same are provided.

Technical Solution

In an embodiment, a separator for a lithium secondary battery includes a porous substrate, and a coating layer on at least one surface of the porous substrate, wherein the coating layer includes a heat-resistant binder including a (meth) acrylic copolymer including a first structural unit derived from (meth)acrylamide, and a second structural unit including at least one of a structural unit derived from (meth) acrylic acid or (meth)acrylate, and a structural unit derived from (meth)acrylamidosulfonic acid or a salt; an adhesive binder having a core-shell structure; and inorganic particles, wherein the adhesive binder has an average particle diameter of 0.2 μm to 1.0 μm, and the inorganic particles have an average particle diameter of 0.2 μm to 1.0 μm.

In another embodiment, a lithium secondary battery includes a positive electrode, a negative electrode, and the separator for a lithium secondary battery between the positive electrode and the negative electrode.

Advantageous Effects

A lithium secondary battery having excellent cycle-life characteristics including a separator for a lithium secondary battery having excellent heat resistance and adhesive strength may be implemented.

DESCRIPTION OF SYMBOLS

Figure 1:
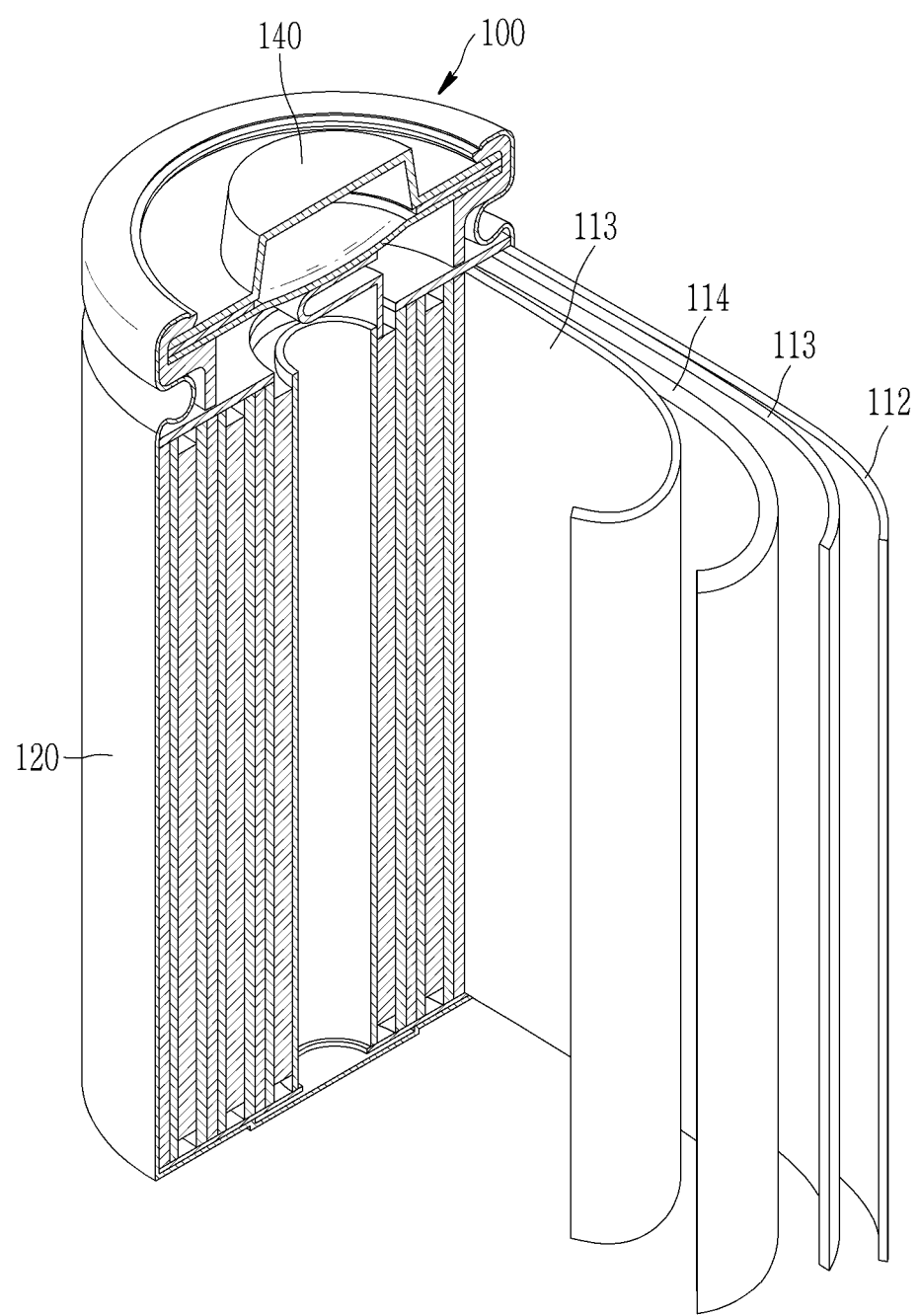
FIG. 1 is an exploded perspective view of a lithium secondary battery according to an embodiment.

100: lithium secondary battery
112: negative electrode
113: separator
114: positive electrode
120: battery case
140: sealing member
1: adhesive binder
2: inorganic particle
3: organic filler
10: adhesive layer
20: heat-resistant layer
30, 30': coating layer

MODE FOR INVENTION

Hereinafter, embodiments of the present invention are described in detail. However, these embodiments are exemplary, the present invention is not limited thereto and the present invention is defined by the scope of claims.

In the present specification, when a definition is not otherwise provided "substituted" refers to replacement of hydrogen of a compound by a substituent selected from a halogen atom (F, Br, Cl, or I), a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C30 aryl group, a C7 to C30 arylalkyl group, a C1 to C4 alkoxy group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C2 to C20 heterocycloalkyl group, and a combination thereof.

In the present specification, when a definition is not otherwise provided, the term "hetero" refers to one including 1 to 3 heteroatoms selected from N, O, S, and P.

In the present specification "combination thereof" refers to a mixture, a copolymer, a blend, an alloy, a composite, a reaction product of components.

In the present specification, "(meth)acrylic" refers to acrylic or methacrylic.

A separator for a lithium secondary battery according to an embodiment includes a porous substrate and a coating layer on one surface or both surfaces of the porous substrate.

The porous substrate may have a plurality of pore and may generally be a porous substrate used in an electrochemical device. Non-limiting examples of the porous substrate may be a polymer film formed of a polymer, or a copolymer or a mixture of two or more selected from polyolefin such as polyethylene, polypropylene, and the like, a polyester such as polyethylene terephthalate, polybutylene terephthalate, and the like, polyacetal, polyamide, polyimide, polycarbonate, polyetheretherketone, polyaryletherketone, polyetherimide, polyamideimide, polybenzimidazole, polyether sulfone, a polyphenylene oxide, a cyclic olefin copolymer, polyphenylene sulfide, polyethylene naphthalate, a glass fiber, Teflon, and polytetrafluoroethylene.

The porous substrate may be, for example, a polyolefin-based substrate including polyolefin, and the polyolefin-based substrate has excellent shutdown function, thereby contributing to improvement of the safety of a battery. The polyolefin-based substrate may be, for example, selected from selected from a polyethylene single film, a polypropylene single film, a polyethylene/polypropylene double film, a polypropylene/polyethylene/polypropylene triple film, and a polyethylene/polypropylene/polyethylene triple film. In addition, the polyolefin-based resin may include a non-olefin resin in addition to an olefin resin or a copolymer of olefin and a non-olefin monomer.

The porous substrate may have a thickness of about 1 μm to 40 μm, for example 1 μm to 30 μm, 1 μm to 20 μm, 5 μm to 15 μm, or 10 μm to 15 μm.

A separator according to an embodiment may be described with reference to FIGS. 3 to 5.

Figure 4:
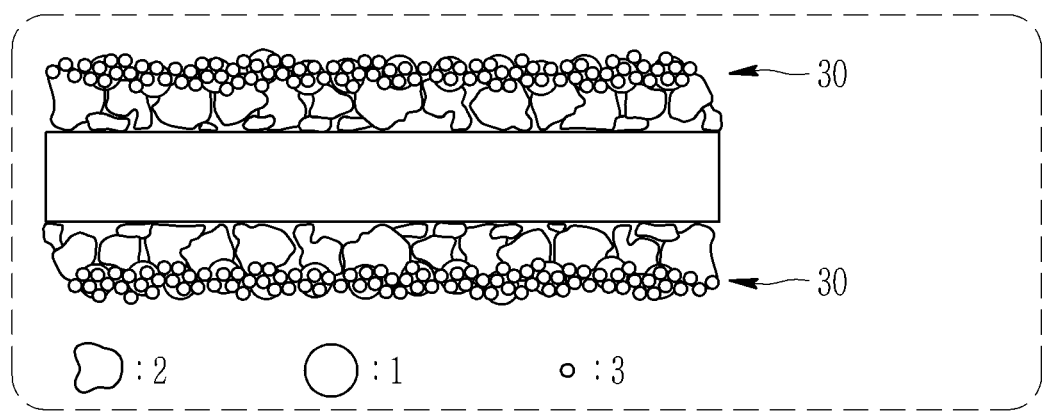
FIG. 4 is a schematic view of a separator according to another embodiment.

Referring to FIG. 4, the separator according to an embodiment may include a coating layer 30 including a heat-resistant binder (not shown), an adhesive binder 1 and inorganic particles 2.

The coating layer may optionally include an organic filler 3.

Figure 3:
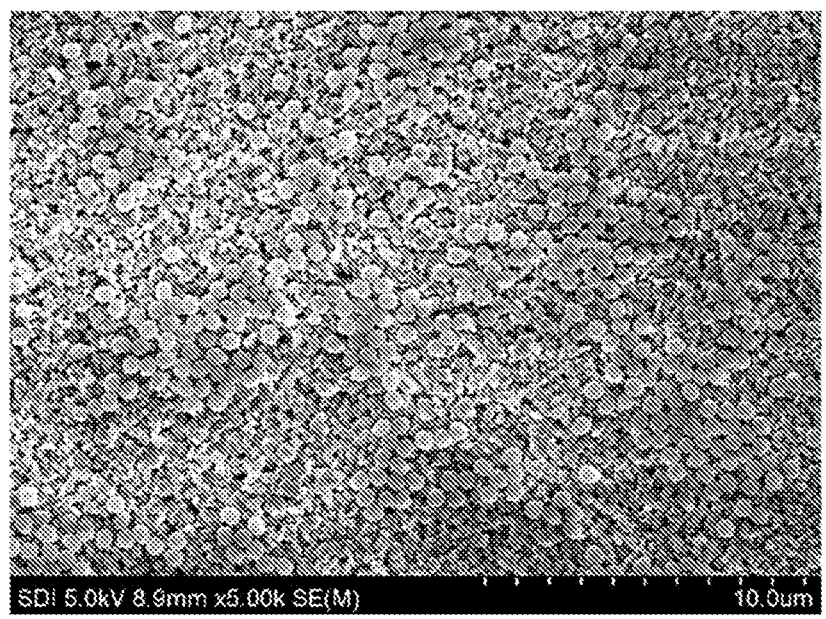
FIG. 3 is an SEM photograph of a coating layer of the separator according to an embodiment.
Figure 5:
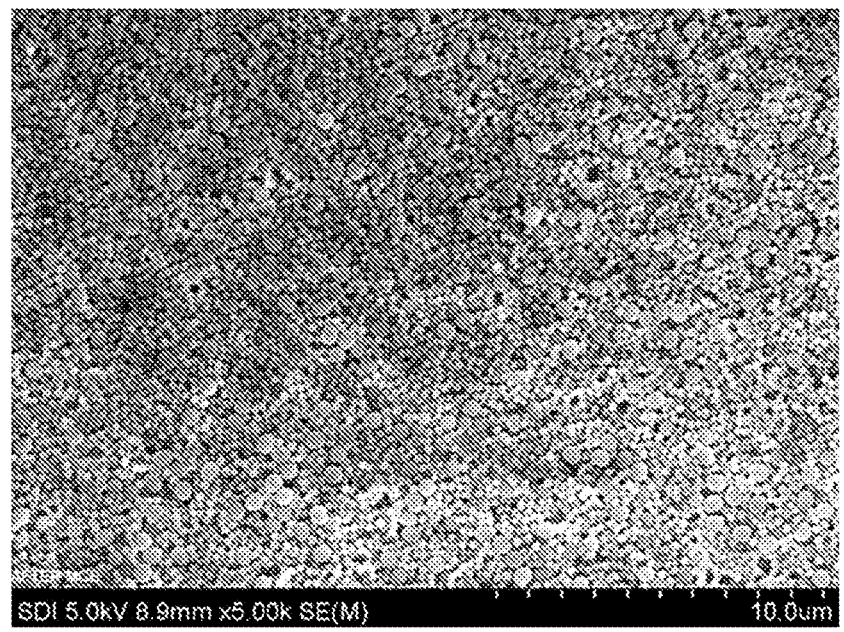
FIG. 5 is an SEM photograph of a coating layer of a separator according to another embodiment.

FIGS. 3 and 5 are SEM photographs of coating layers of separators. FIG. 3 is an SEM photograph of a composition without an organic filler, and FIG. 5 is an SEM photograph of a composition additionally including an organic filler.

The heat-resistant binder may include a (meth)acrylic copolymer including a first structural unit derived from (meth)acrylamide, and a second structural unit including at least one of a structural unit derived from (meth)acrylic acid or (meth)acrylate, and a structural unit derived from (meth)acrylamidosulfonic acid or a salt.

The first structural unit derived from the (meth)acrylamide includes an amide functional group (—NH$_2$) in the structural unit. The —NH$_2$ functional group may improve adhesion characteristics of the porous substrate and the electrode, and by forming a hydrogen bond with the —OH functional group of the inorganic particles, the inorganic particles may be more firmly fixed in the coating layer, and thus the heat resistance of the separator may be strengthened.

The structural unit derived from the (meth)acrylic acid or (meth)acrylate included in the second structural unit serves to fix the inorganic particles on the porous substrate, and at the same time, allows the coating layer to adhere well to the porous substrate and the electrode. It may contribute to the improvement of heat resistance and air permeability of the separator. In addition, the structural unit derived from the (meth)acrylic acid or (meth)acrylate may contribute to improving dispersibility of the coating slurry by including a carboxyl functional group (—C(=O)O—) in the structural unit.

In addition, the structural unit derived from the (meth)acrylamidosulfonic acid or a salt thereof included in the second structural unit includes a bulky functional group, thereby reducing the mobility of the copolymer including the same, thereby enhancing the heat resistance of the separator.

In an embodiment, the (meth)acrylic copolymer may be a two component copolymer including a first structural unit derived from (meth)acrylamide, and a second structural unit derived from (meth)acrylic acid or (meth)acrylate; a two component copolymer including a first structural unit derived from (meth)acrylamide and a second structural unit derived from (meth)acrylamidosulfonic acid or a salt thereof; or a three component copolymer including a first structural unit derived from (meth)acrylamide, and a second structural unit including a structural unit derived from (meth)acrylic acid or (meth)acrylate, and a structural unit derived from (meth)acrylamidosulfonic acid or a salt thereof.

The first structural unit may be included in an amount of 55 to 95 mol % based on 100 mol % of the (meth)acrylic copolymer, and the second structural unit may be included in an amount of 5 mol % to 45 mol % based on 100 mol % of the (meth)acrylic copolymer.

In an embodiment, the first structural unit may be included in an amount of 75 mol % to 95 mol %, for example 80 mol % to 95 mol % based on 100 mol % of the (meth)acrylic copolymer.

Meanwhile, the structural unit derived from the (meth)acrylic acid or (meth)acrylate among the second structural units may be included in an amount of 0 to 40 mol % based on 100 mol % of the (meth)acrylic copolymer, and the structural unit derived from (meth)acrylamidosulfonic acid or a salt thereof may be included in an amount of 0 to 10 mol % based on 100 mol % of the (meth)acrylic copolymer.

For example, the structural unit derived from the (meth)acrylamide may be included in an amount of 80 mol % to 90 mol % based on 100 mol % of the (meth)acrylic copolymer, the structural unit derived from (meth)acrylic acid or (meth)acrylate may be included in an amount of 0 mol % to 10 mol % based on 100 mol % of the (meth)acrylic copolymer, and the structural unit derived from (meth)acrylamidosulfonic acid or a salt thereof may be included in an amount of 0 mol % to 10 mol % based on 100 mol % of the (meth)acrylic copolymer.

When the amount of each structural unit is within the above range, heat resistance and adhesive strength of the separator may be further improved.

The first structural unit derived from the (meth)acrylamide may be, for example, represented by Chemical Formula 1.

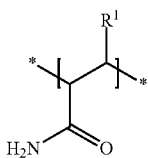

[Chemical Formula 1]

In Chemical Formula 1, $R^1$ is hydrogen or a C1 to C6 alkyl group.

The structural unit derived from the (meth)acrylic acid or (meth)acrylate may be, for example, represented by any one of Chemical Formula 2, Chemical Formula 3, and a combination thereof.

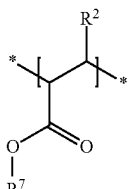

[Chemical Formula 2]

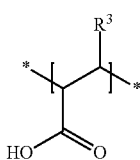

[Chemical Formula 3]

In Chemical Formula 2 and Chemical Formula 3, $R^2$ and $R^3$ are each independently hydrogen or a C1 to C6 alkyl group, and $R^7$ is a substituted or unsubstituted C1 to C20 alkyl group.

The structural unit derived from (meth)acrylate may be derived from (meth)acrylic acid alkyl ester, (meth)acrylic acid perfluoroalkyl ester, and (meth)acrylate having a functional group in the side chain. It may be, for example, derived from (meth)acrylate alkyl ester. In addition, the number of carbon atoms of the alkyl group or perfluoroalkyl group bound to the noncarbonyl oxygen atom of the (meth) acrylic acid alkyl ester or (meth)acrylic acid perfluoroalkyl ester may be specifically 1 to 20, more specifically 1 to 10, for example, 1 to 5.

Specific examples of the (meth)acrylic acid alkyl ester in which the carbon number of an alkyl group or a perfluoroalkyl group bound to the non-carbonyl oxygen atom is 1 to 5 may be acrylic acid alkyl ester such as methyl acrylate, ethyl acrylate, n-propyl acrylate, isopropyl acrylate, n-butyl acrylate, and t-butyl acrylate, and the like; 2-(perfluoroalkyl) ethyl acrylate such as 2-(perfluorobutyl) ethyl acrylate, 2-(perfluoropentyl) ethyl acrylate, and the like; methacrylic acid alkyl ester such as methyl methacrylate, ethyl methacrylate, n-propyl methacrylate, isopropyl methacrylate, n-butyl methacrylate, and t-butyl methacrylate, and the like; and 2-(perfluoroalkyl) ethyl methacrylate such as 2-(perfluorobutyl) ethyl methacrylate, 2-(perfluoropentyl) ethyl methacrylate, 2-(perfluoroalkyl) ethyl methacrylate, and the like.

Other (meth)acrylic acid alkyl ester may be acrylic acid alkyl ester in which the carbon number of the alkyl group bound to the non-carbonyl oxygen atom is 6 to 18 such as n-hexyl acrylate, 2-ethylhexyl acrylate, nonyl acrylate, lauryl acrylate, stearyl acrylate, cyclohexyl acrylate, and isobornyl acrylate, and the like; methacrylic acid alkyl ester in which the carbon number of the alkyl group bound to the non-carbonyl oxygen atom is 6 to 18 such as n-hexyl methacrylate, 2-ethylhexyl methacrylate, octyl methacrylate, isodecyl methacrylate, lauryl methacrylate, tridecyl methacrylate, stearyl methacrylate, and cyclohexyl methacrylate; 2-(perfluoroalkyl) ethyl acrylate in which the carbon number of the perfluoroalkyl group bound to the non-carbonyl oxygen atom is 6 to 18 such as 2-(perfluorohexyl) ethyl acrylate, 2-(perfluorooctyl) ethyl acrylate, 2-(perfluorononyl) ethyl acrylate, 2-(perfluorodecyl) ethyl acrylate, 2-(perfluorododecyl) ethyl acrylate, 2-(perfluorotetradecyl) ethyl acrylate, 2-(perfluorohexadecyl) ethyl acrylate, and the like; 2-(perfluoroalkyl) ethyl methacrylate in which the carbon number of the perfluoroalkyl group bound to the non-carbonyl oxygen atom is 6 to 18 such as 2-(perfluorohexyl) ethyl methacrylate, 2-(perfluorooctyl) ethyl methacrylate, 2-(perfluorononyl) ethyl methacrylate, 2-(perfluorodecyl) ethyl methacrylate, 2-(perfluorododecyl) ethyl methacrylate, 2-(perfluorotetradecyl) ethyl methacrylate, 2-(perfluorohexadecyl) ethyl methacrylate, and the like.

For example, the structural unit derived from (meth) acrylic acid or (meth)acrylate includes a structural unit represented by Chemical Formula 2 and a structural unit represented by Chemical Formula 3 respectively or both of them together, and when the structural units are included together, the structural units represented by Chemical Formulae 2 and 3 may be included in a mole ratio of 10:1 to 1:1, specifically, 6:1 to 1:1, and more specifically, 3:1 to 1:1.

The structural unit derived from (meth)acrylamido sulfonic acid or a salt thereof may be a structural unit derived from (meth)acrylamido sulfonic acid or (meth)acrylamido sulfonate, wherein the (meth)acrylamido sulfonate may be a conjugate base of the (meth)acrylamido sulfonic acid, (meth)acrylamido sulfonate salt, or a derivative thereof. The structural unit derived from the (meth)acrylamidosulfonic acid or (meth)acrylamidosulfonate may be represented by, for example, one of Chemical Formula 4, Chemical Formula 5, Chemical Formula 6, and a combination thereof.

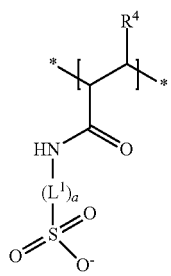

[Chemical Formula 4]

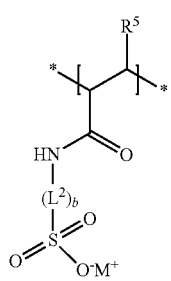

[Chemical Formula 5]

[Chemical Formula 6]

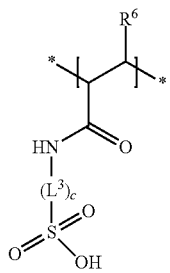

[Chemical Formula 7]

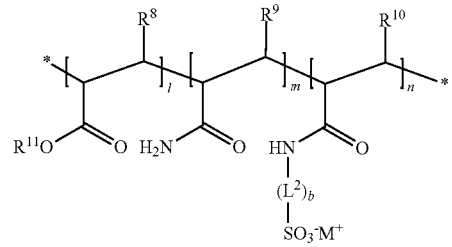

In Chemical Formula 4 to Chemical Formula 6, $R^4$, $R^5$, and $R^6$ are each independently hydrogen or a C1 to C6 alkyl group, $L^1$, $L^2$, and $L^3$ are each independently a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 heterocyclic group, a, b, and c are each independently an integer ranging from 0 to 2, and M is an alkali metal, wherein the alkali metal may be for example lithium, sodium, potassium, rubidium, or cesium.

For example, in Chemical Formula 4 to Chemical Formula 6, $L^1$, $L^2$, and $L^3$ may each independently be a substituted or unsubstituted C1 to C10 alkylene group, and a, b, and c may each be 1.

The structural unit derived from the (meth)acrylamidosulfonic acid or a salt thereof may include each of a structural unit represented by Chemical Formula 4, a structural unit represented by Chemical Formula 5, and a structural unit represented by Chemical Formula 6, or two or more types therefrom. As one example, the structural unit represented by Chemical Formula 5 may be included, and as another example, the structural unit represented by Chemical Formula 5 and the structural unit represented by Chemical Formula 6 may be included together.

When the structural unit represented by Chemical Formula 5 and the structural unit represented by Chemical Formula 6 are included together, the structural unit represented by Chemical Formula 5 and the structural unit represented by Chemical Formula 6 may be included in a mole ratio of 10:1 to 1:2, desirably 5:1 to 1:1, and more desirably 3:1 to 1:1.

A sulfonate group in the structural unit derived from (meth)acrylamido sulfonic acid or a salt thereof may be for example a functional group derived from vinyl sulfonic acid, allyl sulfonic acid, styrene sulfonic acid, anethole sulfonic acid, acrylamidoalkane sulfonic acid, sulfoalkyl (meth)acrylate, or a salt thereof.

Herein, the alkane may be C1 to C20 alkane, C1 to C10 alkane, or C1 to C6 alkane and the alkyl may be C1 to C20 alkyl, C1 to C10 alkyl, or C1 to C6 alkyl. The salt refers to a salt composed of the aforementioned sulfonic acid and appropriate ions. The ion may be for example an alkali metal ion and in this case, the salt may be an alkali metal sulfonate salt.

The acryl amidoalkane sulfonic acid may be for example 2-acrylamido-2-methylpropane sulfonic acid and the sulfoalkyl (meth)acrylate may be for example 2-sulfoethyl (meth)acrylate, 3-sulfopropyl (meth)acrylate, and the like.

The (meth)acrylic copolymer may be for example represented by Chemical Formula 7.

In Chemical Formula 7, $R^8$ to $R^{10}$ are each independently hydrogen or a methyl group, $R^{11}$ is hydrogen or a C1 to C6 alkyl group, $L^2$ is a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 heterocyclic group, b is one of integers of 0 to 2, M is an alkali metal of lithium, sodium, potassium, rubidium, cesium, and the like, and l, m, and n refers to a mole ratio of each unit.

For example, in Chemical Formula 7, l+m+n=1. In addition, for example, l, m, and n may satisfy $0.05 \leq (l+n) \leq 0.45$, $0.55 \leq m \leq 0.95$, specifically $0 \leq l \leq 0.4$, and $0 \leq n \leq 0.1$, for example $0.8 \leq m \leq 0.9$, $0 \leq l \leq 0.1$, and $0 \leq n \leq 0.1$.

For example, in Chemical Formula 7, $L^2$ may be a substituted or unsubstituted C1 to C10 alkylene group and b may be 1.

In the (meth)acrylicacrylic copolymer, the structural unit substituted with the alkali metal ($M^+$) may be 50 mol % to 100 mol %, for example 60 mol % to 90 mol % or 70 mol % to 90 mol % based on a total amount, 100 mol %, of the (meth)acrylamido sulfonic acid structural unit. When the ranges are satisfied, the (meth) acrylic copolymer and the separator including the same may exhibit improved adhesive strength, heat resistance, and oxidation resistance.

The (meth)acrylic copolymer may further include other units in addition to the units. For example the (meth)acrylic copolymer may further include a unit derived from alkyl (meth)acrylate, a unit derived from a diene-based monomer, a unit derived from a styrene-based monomer, an ester group-containing unit, a carbonate group-containing unit, or a combination thereof.

The (meth)acrylic copolymer may have various forms, that is, an alternate polymer where the units are alternately distributed, a random polymer the units are randomly distributed, or a graft polymer where a part of structural unit is grafted.

A weight average molecular weight of the (meth)acrylic copolymer may be 350,000 to 970,000, for example 450,000 to 970,000, or 450,000 to 700,000. When the weight average molecular weight of the (meth)acrylic copolymer satisfies the ranges, the (meth)acrylic copolymer and the separator including the same may exhibit excellent adhesive strength, heat resistance, and air permeability. The weight average molecular weight may be polystyrene-reduced average molecular weight measured by gel permeation chromatography.

The (meth)acrylic copolymer may be prepared by various methods such as emulsion polymerization, suspension polymerization, massive polymerization, solution polymerization, or bulk polymerization.

The adhesive binder has a core-shell structure, specifically, may be a (meth)acrylic polymer including a structural unit derived from (meth)acrylic acid or (meth)acrylate and a structural unit derived from a monomer including a polymerizable unsaturated group.

More specifically, a core of the adhesive binder includes a structural unit derived from (meth)acrylic acid or (meth)acrylate and a shell of the adhesive binder may include the structural unit derived from a monomer including a polymerizable unsaturated group.

In the separator according to an embodiment, the heat-resistant binder including the aforementioned (meth)acrylic copolymer serves to secure heat resistance to reduce the heat shrinkage rate at high temperature of the separator, and the adhesive binder secures adhesive strength to the electrode of the separator. The heat resistance and adhesive strength are in a trade-off relationship with each other. In an embodiment, by further including the adhesive binder together with the heat-resistant binder, the heat-resistant binder and the adhesive binder each independently exist in the coating layer, so that a separator having excellent heat resistance and adhesive strength may be implemented.

In addition, the separator may maintain heat resistance and adhesive strength due to the adhesive binder, and may improve battery stability and cycle-life, and also improve the resistance of the battery when used in a battery.

The structural unit derived from (meth)acrylic acid or (meth)acrylate included in the core of the adhesive binder may be represented by, for example, any one of Chemical Formula 2, Chemical Formula 3, and a combination thereof, as in the heat-resistant binder described above.

The monomer including a polymerizable unsaturated group included in the shell of the adhesive binder may be at least one selected from a styrene-based monomer, an acid-derived monomer, and a combination thereof.

Specifically, the styrene-based monomer may include at least one aromatic vinyl monomer represented by Chemical Formula 8.

[Chemical Formula 8]

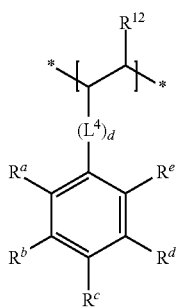

In Chemical Formula 8,
$R^{12}$ is hydrogen or a C1 to C6 alkyl group,
$R^a$ to $R^e$ are each independently hydrogen or a C1 to C6 alkyl group,
$L^4$ is a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 heterocyclic group,
d is one of integers of 0 to 2, and
* is a linking point.

Specifically, the styrene-based monomer may be at least one selected from methyl styrene, bromo styrene, chloro styrene, and a combination thereof as well as styrene.

More specifically, the acid-derived monomer includes a substituent corresponding to —COOH and may be at least one selected from itaconic acid, (meth)acrylic acid, and a combination thereof.

Herein, the adhesive binder may be crosslinked or non-crosslinked. In order to prepare a crosslinked (meth)acrylic polymer, a crosslinking agent may be further added in the polymerization.

The acrylic adhesive binder may have a glass transition temperature of greater than or equal to 50° C. and less than or equal to 110° C., if it is present.

Within the range, satisfactory ion conductivity as well as excellent adhesive strength to the substrate is obtained.

The adhesive binder may have a predetermined swelling degree with respect to the electrolyte. Specifically, the mass increase rate (swelling degree) due to the electrolyte when left to stand at 60° C. for 72 hours may be 50 to 500% or less.

When the swelling degree for the electrolyte exceeds the upper limit, the adhesion area of the coating layer in the electrolyte may be increased, but the adhesive strength due to swelling may be reduced and the passage of Li ions may be blocked to increase battery resistance.

On the other hand, when the swelling degree for the electrolyte is less than the lower limit, the electrode-separator interface may be detached off during use because adhesion with the electrode does not occur smoothly, resulting in an increase in side reactions leading to a decrease in battery reliability.

Herein, as the electrolyte used to measure the swelling degree for the electrolyte, a solution obtained by dissolving $LiPF_6$ (as a supporting electrolyte at a concentration of 1 mol/L) in a mixed solvent of ethylene carbonate (EC), diethyl carbonate (DEC), and dimethyl carbonate (DMC) (volume mixing ratio: EC/DEC/DMC=2/4/4) is used.

The swelling degree for the electrolyte may be specifically measured as follows.

First, a polymer is prepared. After that, a film is produced from the prepared polymer. For example, if the polymer is a solid, after drying the polymer under the conditions of a temperature of 85° C. and 48 hours, the polymer is molded into a film to produce a film having a thickness of 0.5 mm. In addition, for example, if the polymer is a solution or dispersion such as latex, the solution or dispersion is placed in a polytetrafluoroethylene sachet and dried at a temperature of 85° C. for 48 hours to produce a film with a thickness of 0.5 mm.

Next, the film produced as described above is cut into a 1 cm square to obtain a specimen. Measure the weight of this specimen and make it $W_0$. Further, the specimen is immersed in the electrolyte at a temperature of 60° C. for 72 hours, and the specimen is taken out from the electrolyte. The electrolyte on the surface is wiped off of the specimen, and the weight $W_1$ of the specimen after immersion is measured.

Using these weights $W_0$ and $W_1$, the swelling degree S (times) is calculated as $S=W_1/W_0$.

In addition, a method of adjusting the swelling degree for the electrolyte of the polymer may be, for example, appropriately selecting the type and amount of the monomers for producing the polymer, considering a SP value of the electrolyte.

In addition, the monomers used to produce the polymer of the shell, one in which the swelling degree for the electrolyte of the polymer falls within the above range may be selected and used. As such a monomer, for example, one type may be used alone, or two or more types may be used in combination at an arbitrary ratio.

For example, aromatic vinyl monomers are desirable. That is, it is desirable that the polymer of the shell includes an aromatic vinyl monomer unit. Moreover, among aromatic vinyl monomers, styrene derivatives, such as styrene and styrene sulfonic acid, may be more desirable. When an aromatic vinyl monomer is used, the swelling degree for the electrolyte of the polymer may be easily adjusted. In addition, the adhesion of the coating layer may be further increased.

A proportion of the aromatic vinyl monomer unit in the polymer of the shell may be desirably greater than or equal to 20 mass %, more desirably greater than or equal to 40 mass %, still more desirably greater than or equal to 50 mass %, even more desirably greater than or equal to 60 mass %, particularly greater than or equal to 80 mass %, and desirably less than or equal to 100 mass %, more desirably less than or equal to 99.5 mass %, and still more desirably less than or equal to 99 mass %. By making the proportion of the aromatic vinyl monomer unit fall within the above range, it is easy to control the swelling degree for the electrolyte of the shell within the above range. In addition, it is possible to further increase the adhesive strength of the coating layer in the electrolyte.

In addition, the shape of the shell is not particularly limited, but it is preferable that the shell is made of a particulate polymer.

When the shell is made of the particulate polymer, a plurality of particles constituting the shell may be overlapped in the radial direction of the particles. However, in the radial direction of the particles, it is preferable that the particles constituting the shell are not overlapped, and the particles of the polymer constitute the shell portion in a single layer.

The adhesive binder may have an average particle diameter of 0.2 μm to 1.0 μm, specifically 0.2 μm to 0.7 μm, for example 0.3 μm to 0.7 μm, or 0.4 μm to 0.7 μm. The particle diameter may be adjusted by controlling an initiator addition amount, an emulsifier addition amount, a reaction temperature, an agitation speed, and the like.

The adhesive binder may be included in an amount of 1 to 20 wt %, specifically 5 to 20 wt %, for example 5 to 15 wt % based on the total amount of the coating layer.

When the adhesive binder is included in a less amount than the low limit, adhesive strength to the substrate is not realized, but when the adhesive binder is included in a larger amount than the upper limit, capacity may be limitedly realized due to a battery resistance increase.

The coating layer on the porous substrate according to an embodiment may include inorganic particles in addition to the aforementioned acrylic heat-resistant binder and adhesive binder.

The inorganic particles may prevent a separator from being sharply shrunk due to a temperature increase. The inorganic particles may be a ceramic material capable of improving heat resistance, for example, $Al_2O_3$, $SiO_2$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, boehmite, or a combination thereof, but are not limited thereto. The inorganic particles may have a spherical shape, a sheet shape, a cubic shape, or an amorphous shape. The inorganic particles may have an average particle diameter of 0.2 μm to 1.0 μm, specifically 0.3 μm to 1.0 μm, for example 0.3 μm to 0.7 μm.

The average particle diameter of the inorganic particles may be particle size ($D_{50}$) at a volume ratio of 50% in a cumulative size-distribution curve. By using the inorganic particles having an average particle diameter within the ranges, the coating layer may have an appropriate strength, thereby improving heat resistance, durability, and stability of the separator.

On the other hand, the coating layer may include the heat-resistant binder including the (meth)acrylic copolymer: the inorganic particles in a weight ratio of 1:20 to 1:40, desirably 1:25 to 1:40, more desirably 1:25 to 1:35. When the (meth)acrylic copolymer, adhesive binder, and inorganic particles are included in the above range in the coating layer, the separator may exhibit excellent heat resistance and air permeability. When the weight ratio of the heat-resistant binder and the inorganic particles is less than 1:20, the porosity of the coating layer may be lowered by the (meth)acrylic copolymer binder, thereby limiting the mobility of Li ions, and the moisture adsorption amount of the binder increases, resulting in deterioration of battery characteristics. In addition, when the weight ratio of the heat-resistant binder and the inorganic particles exceeds 1:40, heat resistance may be weakened due to insufficient content of the binder to adhere the inorganic particles.

A separator according to another embodiment may be described with reference to FIGS. 2, 3, and 5.

Figure 2:
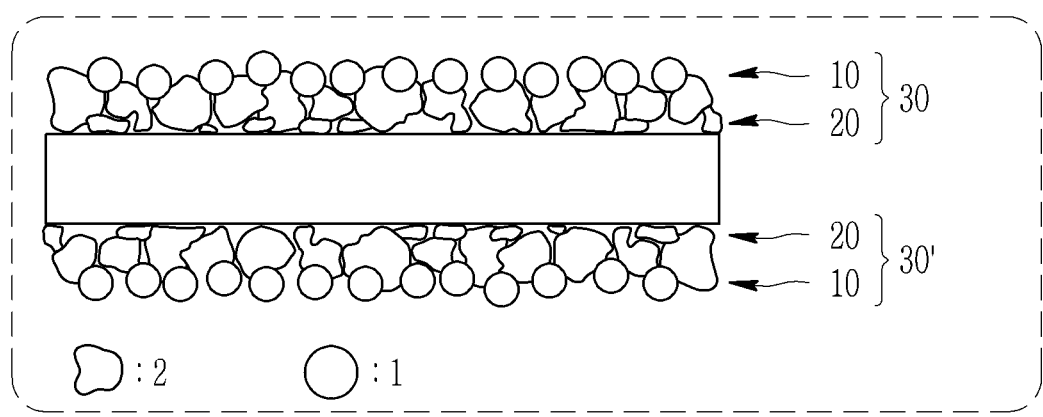
FIG. 2 is a schematic view of a separator according to an embodiment.

Referring to FIG. 2, the separator according to another embodiment may include a coating layer 30' including a heat-resistant binder (not shown), an adhesive binder 1 and inorganic particles 2. In an embodiment, the coating layer may include a heat-resistant layer 20 on the porous substrate, and an adhesive layer 10 on the heat-resistant layer, wherein the heat-resistant binder and inorganic particles 2 may be included in the heat-resistant layer 20 and the adhesive binder 1 may be included in the adhesive layer 10.

The coating layer may optionally include an organic filler (not shown), and the organic filler may be included in at least one of a heat-resistant layer and an adhesive layer. For example, the organic filler may be included in the heat-resistant layer or included in the adhesive layer.

FIGS. 3 and 5 are SEM photographs of the separator coating layer. FIG. 3 is an SEM photograph of a composition without an organic filler, and FIG. 5 is an SEM photograph of a composition additionally including an organic filler.

The coating layer may have a thickness of about 1 μm to 6.5 μm, for example, a thickness of 2 μm to 5 μm.

For example, the thickness of the heat-resistant layer may be 1 μm to 5 μm, and the thickness of the adhesive layer may be 0.4 μm to 1.4 μm, for example, the thickness of the heat-resistant layer is 1.5 μm to 3 μm, and the thickness of the adhesive layer is 0.5 μm to 1.0 μm.

When the thickness of the heat-resistant layer and the adhesive layer are respectively as described above, heat resistance and adhesive strength to the substrate characteristics may be simultaneously expressed, thereby improving battery safety and reliability. When the thickness of the heat-resistant layer is less than the lower limit, the separator shrinks at high temperature and safety cannot be secured. When the thickness exceeds the upper limit, the heat resistance is improved, but performance may be deteriorated due to an increase in moisture content by the coating layer and resistance increase. Since the adhesive layer is coated with one layer of the adhesive binder, the adhesive layer has a thickness similar to the average particle diameter of the adhesive binder.

The heat-resistant layer may further include an organic filler, and by further including an organic filler, withstand voltage characteristics may be enhanced.

In particular, as a portion of the volume occupied by the inorganic particles is replaced with an organic filler, an increase in the moisture content due to the specific surface area of the inorganic particles is suppressed, thereby contributing to improvement of cell cycle-life characteristics.

The average particle diameter of the organic filler may be 120 nm to 500 nm, specifically 120 nm to 400 nm, for example 150 nm to 300 nm.

When the organic filler having the average particle diameter within the above range is used, the coating density of the coating layer is increased, and the contact area between the inorganic particles through the organic filler is increased, thereby providing a separator having excellent heat resistance.

As an example, the inorganic particles: the adhesive binder and the organic filler may have a volume ratio of 33:1 to 1:1, for example, 30:1 to 1:1, or 20:1 to 1:1, and for a specific example, it may be 10:1 to 1:1, or 5:1 to 1:1, for example, 4:1 to 1:1, or 3:1 to 1:1.

As the inorganic particles are replaced with the adhesive binder and the organic filler in the above ratio, the surface roughness of the coating layer is improved, and the coating uniformity of the subsequently coated adhesive layer is improved to improve adhesive strength to the substrate. In addition, the inhibitory effect of increasing the moisture content of the coating layer due to the hydrophobic properties of the inorganic particles may be maximized.

Meanwhile, the organic filler may be included in an amount of 0.1 to 50 wt % based on the total amount of the coating layer. When the content of the organic filler is within the above range, excellent heat resistance may be secured.

For example, the organic filler may be included in an amount of 1 to 50 wt %, 3 to 40 wt %, or 1 to 20 wt % based on the total amount of the coating layer.

For example, the organic filler may be included in an amount of 5 to 20 wt % based on the total amount of the coating layer, but is not limited thereto.

The organic filler may be at least one organic compound selected from a (meth)acrylate-based compound and a derivative thereof, a diallyl phthalate-based compound and a derivative thereof, a polyimide-based compound and a derivative thereof, a copolymer thereof, and a mixture thereof.

The organic filler may be specifically obtained through the following methods.

After dispersing the (meth)acrylate-based compound in an emulsifier, a trace amount of an aqueous copper sulfate solution is added thereto, and then a redox polymerization initiator is added thereto, followed by emulsion polymerization to obtain the organic filler.

Further, the organic filler may be obtained by polymerizing the diallyl phthalate-based compound in the presence of a water-soluble polymerization initiator.

In addition, the organic filler may be obtained by reacting an aldehyde-based compound with emulsion particles composed of a core part made of a hydrophobic polymer and a shell part made of a hydrophilic polymer. At this time, the hydrophobic polymer has a glass transition temperature of greater than or equal 20° C. and an acetacetyl group, and the hydrophilic polymer has a functional group capable of being dispersed in water.

In addition, an organic filler may be obtained as follows: after preparing a polyimide fine particle dispersion in which the polyamic acid fine particles dispersed in a hydrophilic solvent are imidized with acetic anhydride, pyridine, etc., the hydrophilic solvent is removed by centrifugation, and then an aqueous surfactant solution is added to the remaining by-products to replace water to obtain the organic filler.

More specifically, the organic filler may have a highly crosslinked structure.

In an embodiment of the present invention, the organic filler may be a polymer material such as an acrylate-based or methacrylate-based polymer or copolymer. In this case, the glass transition temperature of the polymer may be controlled by controlling the monomer ratio of the polymer or copolymer. For example, an acrylate-based or methacrylate-based polymer or copolymer having a glass transition temperature of 30° C. to 90° C. can be used. However, the present invention is not limited thereto.

The separator for a lithium secondary battery according to an embodiment may be manufactured by known various methods. For example, the separator for a lithium secondary battery may be formed by coating a composition for forming a coating layer on one surface or both surfaces of the porous substrate and then drying the same.

Meanwhile, the composition for forming the coating layer may include an initiator and a solvent in addition to the heat-resistant binder including the (meth)acrylic copolymer, adhesive binder, and inorganic particles.

The initiator may be, for example, a photoinitiator, a thermal initiator, or a combination thereof. The photoinitiator may be used for curing by a photo-polymerization using ultraviolet rays.

Examples of the photoinitiator may be acetophenones such as diethoxyacetophenone, 2-hydroxy-2-methyl-1-phenylpropan-1-one, benzyldimethylketal, 1-hydroxycyclohexyl-phenylketone, and 2-methyl-2-morphine(4-thiomethylphenyl)propan-1-one; benzoinethers such as benzoinmethylether, benzoinethylether, benzoinisopropylether, and benzoinisobutylether; benzophenones such as benzophenone, o-benzoyl methyl benzoate, 4-phenylbenzophenone, 4-benzoyl-4'-methyldiphenylsulfurous acid, 4-benzoyl-N, N-dimethyl-N-[2-(1-oxo-2-propenyloxy) ethyl] benzenemetanamium bromide, and (4-benzoylbenzyl) trimethylammoniumchloride; thioxanthones such as 2,4-diethylthioxanthone, and 1-chloro-4-dichlorothioxanthone; 2,4,6-trimethylbenzoyldiphenylbenzoyloxide, and the like. These may be used alone or as a mixture of two or more.

The thermal initiator may be used for a thermal polymerization. The thermal initiator may include organic peroxide free radical initiator such as diacylperoxides, peroxyketals, ketone peroxides, hydroperoxides, dialkylperoxides, peroxyesters, peroxydicarbonates, and for example, lauroyl peroxide, benzoyl peroxide, cyclohexanone peroxide, 1,1-bis(t-butylperoxy)-3,3,5-trimethyl cyclohexane, t-butyl hydroperoxide which may be used alone or as a mixture of two or more.

The curing may be performed through photocuring, thermal curing, or a combination thereof. The photocuring may be for example performed by radiating ultraviolet (UV) of 150 nm to 170 nm for 5 seconds to 60 seconds.

In addition, the thermal curing may be for example performed at 60° C. to 120° C. for 1 hour to 36 hours, for example, 80° C. to 100° C. for 10 hours to 24 hours.

The solvent is not particularly limited as long as it can dissolve or disperse the heat-resistant binder, the adhesive binder, and the inorganic particles. In an embodiment, the solvent may be an aqueous solvent including water, alcohol, or a combination thereof, and in this case, there is an advantage of being environmentally friendly.

The coating may be performed by, for example, spin coating, dip coating, bar coating, die coating, slit coating, roll coating, inkjet printing, etc., but is not limited thereto.

The drying may be, for example, performed through drying with warm air, hot air, or low humid air, vacuum-drying, or radiation of a far-infrared ray, an electron beam, and the like, but is not limited thereto. The drying process may be, for example, performed at a temperature of 25° C. to 120° C.

The separator for a lithium secondary battery according to an embodiment has excellent heat resistance. Specifically, the separator may have a shrinkage rate of less than 10% or less than or equal to 5% at high temperature. For example, after the separator is left at 150° C. for 60 minutes, the shrinkage rates in the longitudinal direction and the transverse direction of the separator measured may be less than or equal to 5%, respectively.

The separator for a lithium secondary battery according to an embodiment may exhibit excellent air permeability, and may have an air permeability of, for example, less than 160 sec/100 cc·1 in$^2$, less than or equal to 150 sec/100 cc·1 in$^2$, or less than or equal to 140 sec/100 cc·1 in$^2$. That is, the air permeability refers to the time (seconds) it takes for 100 cc of air to permeate the 1 in$^2$ area of the separator.

The separator for a lithium secondary battery may be manufactured by lamination, coextrusion, and the like besides the above method.

Hereinafter, a lithium secondary battery including the separator for a lithium secondary battery will be described.

A lithium secondary battery may be classified into a lithium ion battery, a lithium ion polymer battery, and a lithium polymer battery depending on kinds of a separator and an electrolyte and also may be classified to be cylindrical, prismatic, coin-type, pouch-type, and the like depending on shape. In addition, it may be bulk type and thin film type depending on sizes. Structures and manufacturing methods for lithium ion batteries pertaining to this disclosure are well known in the art.

Herein, as an example of a lithium secondary battery, a cylindrical lithium secondary battery is exemplarily described. FIG. 1 is an exploded perspective view of a lithium secondary battery according to an embodiment. Referring to FIG. 1, a lithium secondary battery 100 according to an embodiment includes a battery cell including a negative electrode 112, a positive electrode 114 facing the negative electrode 112, a separator 113 between the negative electrode 112 and the positive electrode 114, and an electrolyte (not shown) impregnating the negative electrode 112, the positive electrode 114 and the separator 113, and a battery container 120, a battery case containing the battery cell, and a sealing member 140 that seals the container 120.

The positive electrode 114 may include a positive current collector and a positive active material layer formed on the positive current collector. The positive active material layer includes a positive active material, a binder, and optionally a conductive material.

The positive current collector may use aluminum (Al), nickel (Ni), and the like, but is not limited thereto.

The positive active material may use a compound capable of intercalating and deintercallating lithium. Specifically at least one of a composite oxide or a composite phosphate of a metal selected from cobalt, manganese, nickel, aluminum, iron, or a combination thereof and lithium may be used. More specifically, the positive active material may use lithium cobalt oxide, lithium nickel oxide, lithium manganese oxide, lithium nickel cobalt manganese oxide, lithium nickel cobalt aluminum oxide, lithium iron phosphate, or a combination thereof.

The binder improves binding properties of positive active material particles with one another and with a current collector. Specific examples may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto. These may be used alone or as a mixture of two or more.

The conductive material improves conductivity of an electrode. Examples thereof may be natural graphite, artificial graphite, carbon black, a carbon fiber, a metal powder, a metal fiber, and the like, but are not limited thereto. These may be used alone or as a mixture of two or more. The metal powder and the metal fiber may use a metal of copper, nickel, aluminum, silver, and the like.

The negative electrode 112 includes a negative current collector and a negative active material layer formed on the negative current collector.

The negative current collector may use copper, gold, nickel, a copper alloy, but is not limited thereto.

The negative active material layer may include a negative active material, a binder and optionally a conductive material. The negative active material may be a material that reversibly intercalates/deintercalates lithium ions, a lithium metal, a lithium metal alloy, a material capable of doping and dedoping lithium, a transition metal oxide, or a combination thereof.

The material that reversibly intercalates/deintercalates lithium ions may be a carbon material which is any generally-used carbon-based negative active material, and examples thereof may be crystalline carbon, amorphous carbon, or a combination thereof. Examples of the crystalline carbon may be graphite such as amorphous, sheet-shaped, flake-shaped, spherically, shaped or fiber-shaped natural graphite or artificial graphite. Examples of the amorphous carbon may be soft carbon or hard carbon, a mesophase pitch carbonized product, fired coke, and the like. The lithium metal alloy may be an alloy of lithium and a metal selected from Na, K, Rb, Cs, Fr, Be, Mg, Ca, Sr, Si, Sb, Pb, In, Zn, Ba, Ra, Ge, Al, and Sn. The material capable of doping and dedoping lithium may be Si, $SiO_x$ ($0<x<2$), a Si—C composite, a Si—Y alloy, Sn, $SnO_2$, a Sn—C composite, a Sn—Y alloy, and the like, and at least one of these may be mixed with $SiO_2$. The element Y may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof. The transition metal oxide may be vanadium oxide, lithium vanadium oxide, and the like.

The binder and the conductive material used in the negative electrode 112 may be the same as the binder and conductive material of the positive electrode 114.

The positive electrode 114 and the negative electrode 112 may be manufactured by mixing each active material composition including each active material and a binder, and optionally a conductive material in a solvent, and coating the active material composition on each current collector. Herein, the solvent may be N-methylpyrrolidone, and the like, but is not limited thereto. The electrode manufacturing method is well known, and thus is not described in detail in the present specification.

The electrolyte includes an organic solvent a lithium salt.

The organic solvent serves as a medium for transmitting ions taking part in the electrochemical reaction of a battery. Examples thereof may be selected from a carbonate-based solvent, an ester-based solvent, an ether-based solvent, a ketone-based solvent, an alcohol-based solvent, and an aprotic solvent. The carbonate-based solvent may be dimethyl carbonate, diethyl carbonate, dipropyl carbonate, methylpropyl carbonate, ethylpropyl carbonate, methylethyl carbonate, ethylene carbonate, propylene carbonate, butylene carbonate, and the like, and the ester-based solvent may be methyl acetate, ethyl acetate, n-propyl acetate, 1,1-dimethylethyl acetate, methylpropionate, ethylpropionate, γ-butyrolactone, decanolide, valerolactone, mevalonolactone, caprolactone, and the like. The ether-based solvent may be dibutyl ether, tetraglyme, diglyme, dim ethoxyethane, 2-methyltetrahydrofuran, tetrahydrofuran, and the like, and the ketone-based solvent may be cyclohexanone, and the like. The alcohol-based solvent may be ethanol, isopropyl alcohol, and the like, and the aprotic solvent may be nitriles such as R—CN (R is a C2 to C20 linear, branched, or cyclic hydrocarbon group, a double bond, an aromatic ring, or an ether bond), and the like, amides such as dimethyl formamide, dioxolanes such as 1,3-dioxolane, sulfolanes, and the like.

The organic solvent may be used alone or in a mixture of two or more, and when the organic solvent is used in a mixture of two or more, the mixture ratio may be controlled in accordance with a desirable cell performance.

The lithium salt is dissolved in an organic solvent, supplies lithium ions in a battery, basically operates the lithium secondary battery, and improves lithium ion transportation between positive and negative electrodes therein. Examples of the lithium salt may include two or more selected from $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, wherein, x and y are natural numbers, LiCl, LiI, $LiB(C_2O_4)_2$, or a combination thereof, but are not limited thereto.

The lithium salt may be used in a concentration ranging from 0.1 M to 2.0 M. When the lithium salt is included within the above concentration range, an electrolyte may have excellent performance and lithium ion mobility due to optimal electrolyte conductivity and viscosity.

DETAILED DESCRIPTION OF THE EMBODIMENTS

Hereinafter, the above aspects of the present disclosure are illustrated in more detail with reference to examples. However, these examples are exemplary, and the present disclosure is not limited thereto.

Synthesis Example: Preparation of (Meth)Acrylic Copolymer

Synthesis Example 1

After putting distilled water (6361 g), acrylic acid (72.06 g, 1.0 mol), acrylamide (604.1 g, 8.5 mol), potassium persulfate (2.7 g, 0.01 mol), 2-acrylamido-2-methylpropanesulfonic acid (103.6 g, 0.5 mol), and a 5 N lithium hydroxide aqueous solution (1.05 equivalent based on a total amount of 2-acrylamido-2-methylpropanesulfonic acid) in a 10 L four-necked flask equipped with a stirrer, a thermometer, and a cooling tube, an internal pressure thereof was reduced into 10 mmHg with a diaphragm pump and recovered into a normal pressure, which was three times repeated.

The reaction solution was reacted for 12 hours, while the temperature was controlled to be stable within the range of 65° C. to 70° C. After decreasing the temperature down to room temperature, a 25% ammonia aqueous solution was used to adjust pH of the reaction solution into the range of 7 to 8.

In this method, a poly(acrylic acid-co-acrylamide-co-2-acrylamido-2-methylpropanesulfonic acid)sodium salt was prepared. Herein, a mole ratio among acrylic acid, acrylamide, and 2-acrylamido-2-methylpropanesulfonic acid was 10:85:5. The reaction solution (reaction product) was taken by 10 mL or so to measure a non-volatile component, and the result was 9.5% (a theoretical value: 10%).

Example: Preparation of Separator for Lithium Secondary Battery

Example 1

Organic-inorganic dispersion with a solid content of 20% having a weight ratio of a heat-resistant binder:inorganic particles:an organic filler of 1:30:2 was prepared by adding the inorganic particles (0.65 μm, boehmite) milled and dispersed with a bead mill at 25° C. for 30 minutes, crosslinked polymethylmethacrylate (300 nm, PMMA, Nippon Shokubai Co., Ltd.) as the organic filler, and the acrylic heat-resistant binder (10 wt % in distilled water) prepared in Synthesis Example 1 in a water solvent and then, stirring the mixture. This organic-inorganic dispersion was coated to be respectively 1.5 μm thick, that is, 3 μm thick in total, on both surfaces of an 8 μm-thick polyethylene porous substrate (Air permeability: 120 sec/100 cc, Puncture strength: 480 kgf, SK Inc.) in a bar coating method and then, dried at 70° C. for 10 minutes to form a heat-resistant layer of a separator for a lithium secondary battery.

Subsequently, a core-shell adhesive binder (0.6 um, solid content: 15%, PX-SP121, ZEON Chemicals L.P.) was diluted to have a solid of 2% and then, coated to be respectively 0.5 μm thick on the surfaces of the heat-resistant layers in the bar coating method and dried at 50° C. for 10 minutes to form an electrode adhesive layer having a total thickness of 1 μm, manufacturing a separator for a lithium secondary battery.

Example 2

A separator for a lithium secondary battery was manufactured according to the same method as Example 1 except that dispersion prepared by mixing a heat-resistant binder:inorganic particles (0.3 μm, boehmite) in a weight ratio of 1:35 was used to form a heat-resistant layer.

Example 3

A separator for a lithium secondary battery was manufactured according to the same method as Example 1 except that dispersion prepared by mixing a heat-resistant binder:inorganic particles (0.3 μm, boehmite):an organic filler (150 nm, PMMA, Nippon Shokubai Co., Ltd.) in a weight ratio of 1:31:4 was used to form a heat-resistant layer.

Example 4

A separator for a lithium secondary battery was manufactured according to the same method as Example 3 except that the dispersion was coated to be 2 μm thick on a single surface of a substrate instead of being respectively coated to be 1.5 μm thick on both surfaces of the substrate.

Example 5

A separator for a lithium secondary battery was manufactured by mixing a heat-resistant binder:inorganic particles (0.3 μm, boehmite): an organic filler (150 nm, PMMA, Nippon Shokubai Co., Ltd.):an adhesive binder in a weight ratio of 1:30:7:5 to prepare dispersion, and then, coating the dispersion to be respectively 1.5 μm thick, that is, 3 μm thick in total on both surfaces of a substrate and drying it at 70° C. for 10 minutes to form a heat-resistant layer.

Example 6

A separator for a lithium secondary battery was manufactured by mixing an adhesive binder:an organic filler (150 nm, PMMA, Nippon Shokubai Co., Ltd.) in a weight ratio of 1:2 to prepare dispersion and then, coating the dispersion to be respectively 0.5 μm thick, that is, 1.0 μm thick in total, on both surfaces of the heat-resistant layers of Example 2 and drying it at 50° C. for 10 minutes to respectively form an electrode adhesive layer thereon.

Comparative Example 1

Inorganic particles (0.5 μm, alumina) milled and dispersed at 25° C. for 30 minutes were mixed with a bead mill and PVdF-HFP (LBG2, Arkema Inc.) in a weight ratio of 1:5 to prepare a crude acetone solution with a solid of 12%. The crude acetone solution was coated to be respectively 1.5 μm thick, that is, 3 μm thick in total, on both surfaces of a substrate with a dip coater and then, dried at 40° C. under humidity of 50% for 10 minutes to form a heat-resistant layer, manufacturing a separator for a lithium secondary battery.

Comparative Example 2

A separator for a lithium secondary battery was manufactured according to the same method as Example 1 except that inorganic particles having an average particle diameter of 1.3 μm (boehmite) were used.

Comparative Example 3

A separator for a lithium secondary battery was manufactured according to the same method as Example 1 except that the heat-resistant layer alone without the electrode adhesive layer was formed.

Comparative Example 4

A separator for a lithium secondary battery was manufactured according to the same method as Example 3 except that polyvinylpyrrolidone (K90, Basf SE) was used as the heat-resistant binder.

Comparative Example 5

A separator for a lithium secondary battery was manufactured according to the same method as Example 3 except that an adhesive binder having an average particle diameter of 0.15 μm (PX-SP95, ZEON Chemicals L.P.) was used.

Comparative Example 6

A separator for a lithium secondary battery was manufactured according to the same method as Example 1 except that the heat-resistant layer alone without the electrode adhesive layer was formed by using dispersion prepared by mixing a heat-resistant binder:an organic filler (PMMA, PX-A213F ZEON Chemicals L.P.) in a weight ratio of 1:10 without the inorganic particles.

Each composition according to the examples and the comparative examples is shown in Table 1.

TABLE 1

| | Coating layer | | | | | | | |
|---|---|---|---|---|---|---|---|---|
| | Heat-resistant layer | | | | Adhesive layer | | | Weight ratio Heat-resistant binder/inorganic particles/organic filler/adhesive binder |
| | Thickness of | Composition for heat-resistant layer | | | Thickness of | Composition for adhesive layer | | |
| | heat-resistant layer (μm/μm) | Heat resistant binder | Inorganic particles (μm) | Organic filler (μm) | Adhesive binder (μm) | adhesive layer (μm/μm) | Organic filler (μm) | Adhesive binder (μm) | (content of adhesive binder in the coating layer (wt %)) |
| Ex. 1 | 1.5/1.5 | Synthesis Example1 | 0.65 | 0.3 | — | 0.5/0.5 | — | 0.6 | 1/30/2/3 (content of adhesive binder: 8.3 wt %) |
| Ex. 2 | 1.5/1.5 | Synthesis Example1 | 0.3 | — | — | 0.5/0.5 | — | 0.6 | 1/35/0/4 (content of adhesive binder: 10 wt %) |
| Ex. 3 | 1.5/1.5 | Synthesis Example1 | 0.3 | 0.15 | — | 0.5/0.5 | — | 0.6 | 1/31/4/4 (content of adhesive binder: 10 wt %) |
| Ex. 4 | 2.0/0 | Synthesis Example1 | 0.3 | 0.15 | — | 0.5/0.5 | — | 0.6 | 1/31/4/5 (content of adhesive binder: 12.2 wt %) |
| Ex. 5 | 1.5/1.5 | Synthesis Example1 | 0.3 | 0.15 | 0.6 | — | — | — | 1/30/7/5 (content of adhesive binder: 11.6 wt %) |
| Ex. 6 | 1.5/1.5 | Synthesis Example1 | 0.3 | — | — | 0.5/0.5 | 0.15 | 0.6 | 1/35/7/4 (content of adhesive binder: 8.5 wt %) |
| Comp. Ex. 1 | 1.5/1.5 | PVdF-HFP | 0.5 | — | — | — | — | — | 1/5/0/0 |

TABLE 1-continued

| | Coating layer | | | | | | | |
|---|---|---|---|---|---|---|---|---|
| | Heat-resistant layer | | | | Adhesive layer | | | Weight ratio Heat-resistant binder/inorganic particles/organic filler/adhesive binder |
| | Thickness of | Composition for heat-resistant layer | | | Thickness of | Composition for adhesive layer | | |
| | heat-resistant layer (μm/μm) | Heat resistant binder | Inorganic particles (μm) | Organic filler (μm) | Adhesive binder (μm) | adhesive layer (μm/μm) | Organic filler (μm) | Adhesive binder (μm) | (content of adhesive binder in the coating layer (wt %)) |
| Comp. Ex. 2 | 1.5/1.5 | Synthesis Example1 | 1.3 | 0.3 | — | 0.5/0.5 | — | 0.6 | 1/30/2/3 (content of adhesive binder: 8.3 wt %) |
| Comp. Ex. 3 | 1.5/1.5 | Synthesis Example1 | 0.65 | 0.3 | — | — | — | — | 1/30/2/3 (content of adhesive binder: 8.3 wt %) |
| Comp. Ex. 4 | 1.5/1.5 | PVP | 0.3 | 0.15 | — | 0.5/0.5 | — | 0.6 | 1/31/4/4 (content of adhesive binder: 10 wt %) |
| Comp. Ex. 5 | 1.5/1.5 | Synthesis Example1 | 0.65 | 0.3 | — | 0.5/0.5 | — | 0.15 | 1/30/2/3 (content of adhesive binder: 8.3 wt %) |
| Comp. Ex. 6 | 1.5/1.5 | Synthesis Example1 | 0.65 | 0.4 | — | — | — | — | 1/0/10/0 |

Evaluation Examples

Evaluation Example 1: Evaluation of Room Temperature Cycle-Life Characteristics

Manufacture of Lithium Secondary Battery Cell

A 3000 mAh battery cell was manufactured by using LCO as a positive electrode and artificial graphite as a negative electrode and winding them with a separator according to an example embodiment of the present invention and then, housing the wound product in an aluminum pouch, injecting an electrolyte solution including 1.2 mol of $LiPF_6$ and having a composition of EC/PC/PP of 2:1:7, and degassing and sealing the pouch. The manufactured battery cell was compressed at 70° C. for 5 minutes to bond the electrodes with the separator.

The battery cells according to Example 1 and Comparative Example 1 were charged up to 4.4 V at a 1.0 C-rate under a condition of constant current/constant voltage (CC/CV) at 25° C. and cut off at a 0.1 C-rate and then, discharged down to 3.0 V at the 1.0 C-rate.

The charge and discharge as 1 cycle was 200 cycles performed. After the 200 cycles, capacity retentions of the cells were evaluated, and the results are shown in Table 2 and FIG. 6.

TABLE 2

| | Capacity retention (%) |
|---|---|
| Example 1 | 90.9 |
| Comparative Example 1 | 90.4 |
| Comparative Example 5 | 0 |

Figure 6:
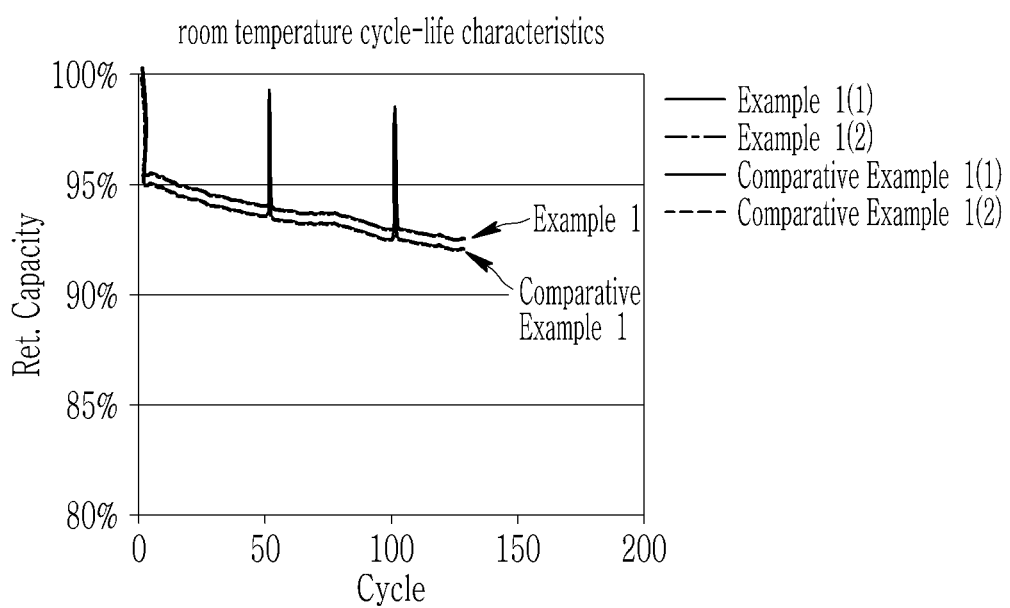
FIG. 6 is a graph showing room temperature cycle-life characteristics of a lithium secondary battery cell.

FIG. 6 is a graph showing room temperature cycle-life characteristics measured twice for each lithium secondary battery cell.

Referring to FIG. 6 and Table 2, the separators according to an example embodiment included an adhesive binder having a core-shell structure but exhibited equally excellent or more excellent cycle-life characteristics than Comparative Example 1 including no adhesive binder.

In general, when an adhesive binder having a core-shell structure is included, the adhesive binder may be transformed during the manufacturing process or the exposure to a high temperature and block pores of a microporous separator and thus deteriorate air permeability and/or lithium ion transfer capability, but the present invention included a (meth)acrylic copolymer according to an example embodiment and thus improved the deterioration of the air permeability and/or lithium ion transfer capability and realized excellent cycle-life characteristics.

In particular, when the adhesive binder had an average particle diameter of less than 200 nm (Comparative Example 5), the transformation of the adhesive binder (swelling, pressing, compression) and the resulting blocking of the pore of a coating layer were much accelerated and thus sharply deteriorated the lithium ion transfer capability, resulting in extremely increasing battery resistance and greatly deteriorating the cycle-life characteristics In other words, the separator according to an embodiment of the present invention included an adhesive binder with an appropriate particle diameter along with a (meth)acrylic copolymer and thus secured an appropriate electrode/separator binding force as well as prevented the deterioration of air permeability and/or lithium ion transfer capability.

Evaluation Example 2: Evaluation of Bending Force

An adhesion between electrode and separator was evaluated by using UTM to perform three point bending force evaluation. Specifically, battery cells were fixed into a lower jig in a length direction and then, pressed at 100 mm/min to measure a maximum force for deforming the cells. The higher the bending force was, the higher the adhesive strength between the electrode and the separator was. The evaluation was performed in the stage of discharging the cells at 3.0 V after completing the initial one cycle, and the results are shown in Table 3.

TABLE 3

| | Bending Force (N) |
|---|---|
| Example 1 | 281 |
| Example 2 | 326 |
| Example 3 | 297 |
| Example 4 | 376 |
| Example 5 | 206 |
| Example 6 | 268 |
| Comparative Example 3 | NG |
| Comparative Example 6 | NG |

Referring to Table 3, the separators including an adhesive binder according to the examples exhibited an excellent bending force, but the separators including no adhesive binder (Comparative Examples 3 and 6) had no adhesion to electrodes and thus were immeasurable with respect to the bending force, wherein cells including the same had problems of hardly maintaining a battery shape by an exterior material (aluminum pouch) during the charge/discharge and thus being twisted, accelerating formation of by-products such as lithium precipitates and the like due to uneven distances between the interfaces of the electrodes, and having a sharp battery thickness increase.

Evaluation Example 3: Hot Box Test

A hot box test was performed by putting the cells in a chamber installed with a safety apparatus and fixing them thereinto to measure a surface temperature and a voltage and then, measuring a voltage form, while a chamber temperature was increased. Herein, when a separator is shrunken, a voltage drop may occur, and severely, ignition and explosion may occur. When the chamber temperature reached a target temperature, the cells were allowed to stand for 1 hour and then, evaluated as Pass of the hot box test when the ignition/explosion did not occur but as Fail of the hot box test when the ignition/explosion occurred.

Figure 7:
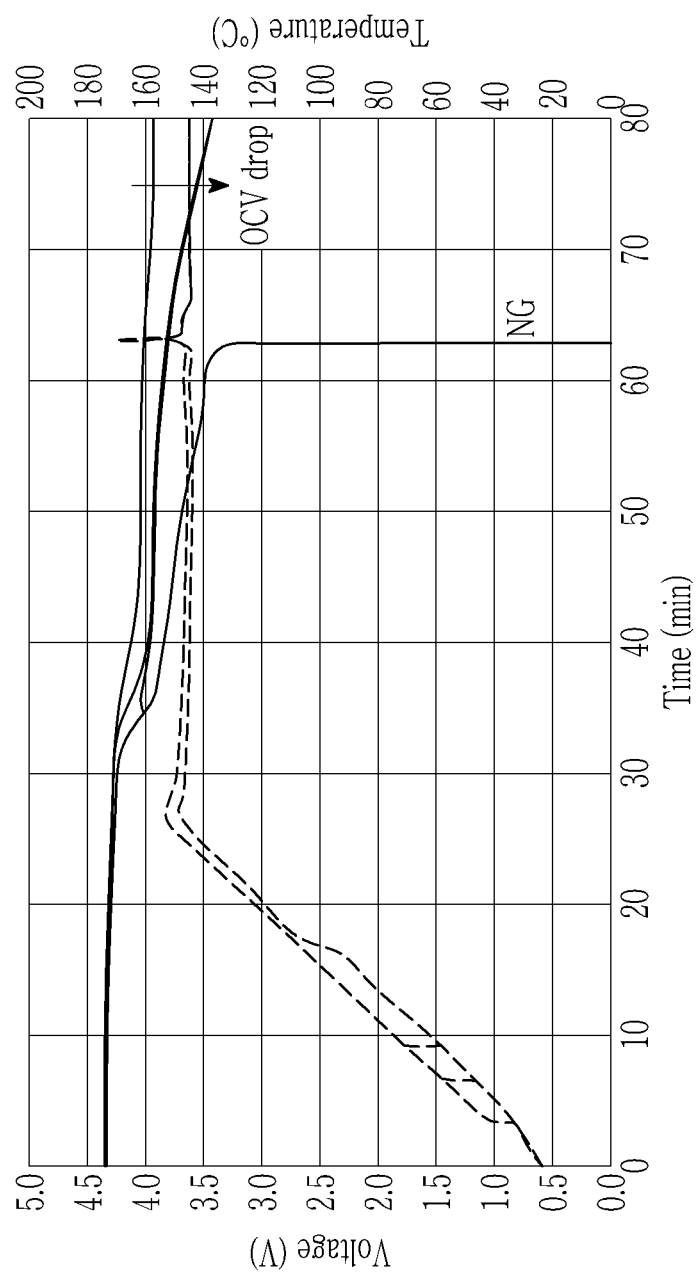
FIG. 7 is a graph showing the results of analyzing the OCV drop phenomenon of the lithium secondary battery cell according to Comparative Example 1.
Figure 8:
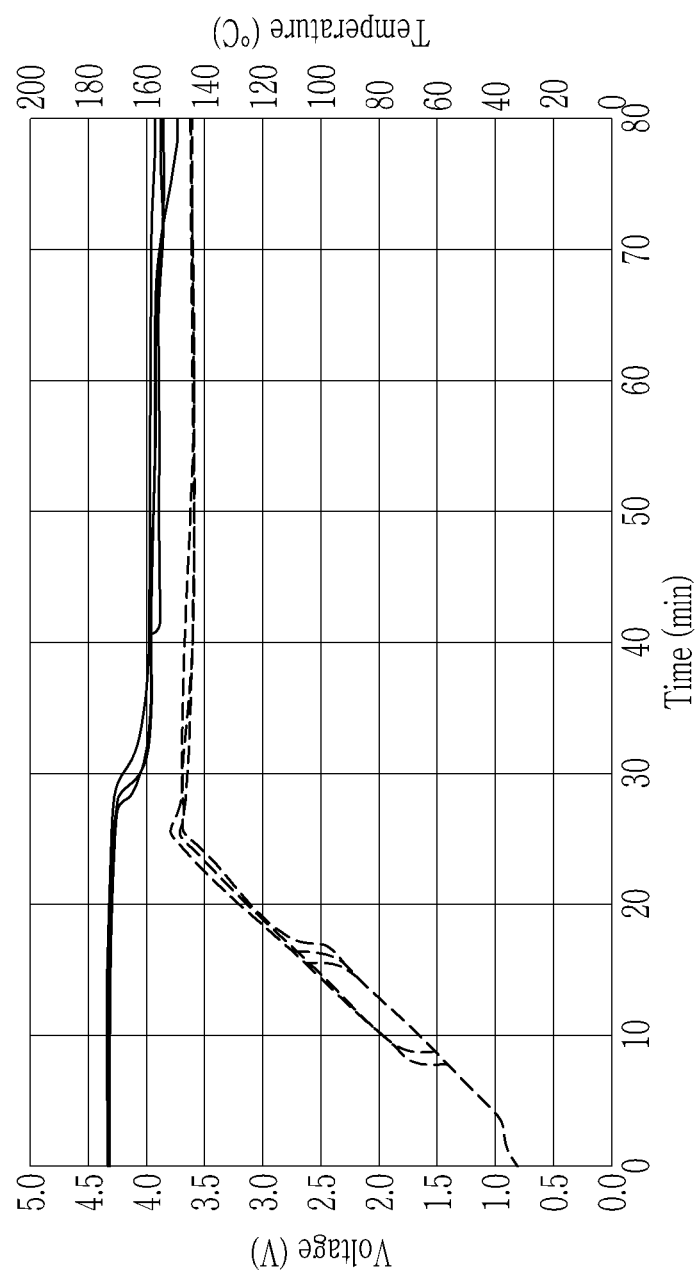
FIG. 8 is a graph showing the results of analyzing the OCV drop phenomenon of the lithium secondary battery cell according to Example 3.

The 150° C. hot box test results are shown in FIGS. 7 and 8.

FIG. 7 is a graph showing the results of analyzing the OCV drop phenomenon of the lithium secondary battery cell according to Comparative Example 1 and FIG. 8 is a graph showing the results of analyzing the OCV drop phenomenon of the lithium secondary battery cell according to Example 3.

Referring to FIGS. 7 and 8, the lithium secondary battery cell of Example 3 was sharply suppressed from the OCV drop phenomenon, compared with the cell of Comparative Example 1, and the reason is that since the separator shrinkage at a high temperature was suppressed, a micro short circuit area was minimized.

Evaluation Example 4: Evaluation of Heat Shrinkage Rate

150° C. heat shrinkage rates were obtained by cutting the separators for a lithium secondary battery into a size of 10 cm×10 cm to prepare samples, drawing a quadrangle with a size of 8 cm×8 cm on the surfaces of the samples, inserting the samples between papers or alumina powers, leaving them in an oven at 150° C. for 60 minutes, and measuring shrinkage lengths in horizontal/vertical directions.

After left for 1 hour and taken therefrom, the sides of the drawn rectangle were measured to obtain the shrinkage lengths of the samples and then, used to calculate each shrinkage rate in each vertical direction (MD) and horizontal direction (TD), and the results are shown in Table 4.

Figure 9:
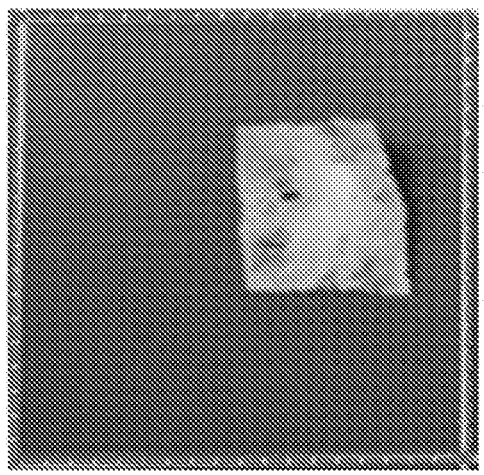
FIG. 9 is a sample photograph for comparing the results of evaluating the shrinkage rate at 150° C.
Figure 9:
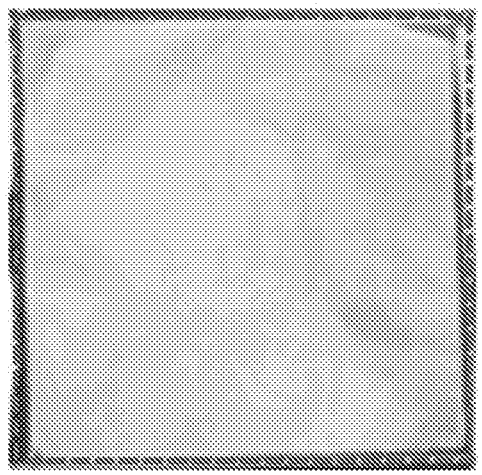

FIG. 9 is a sample photograph for comparing the results of evaluating the shrinkage rate at 150° C.

TABLE 4

| | 150° C. MD/TD |
|---|---|
| Example 1 | 5/5 |
| Example 2 | 2/2 |
| Example 3 | 2/2 |
| Example 4 | 5/5 |
| Example 5 | 4/4 |
| Example 6 | 3/2 |
| Comparative Example 1 | 50/50 |
| Comparative Example 2 | 50/50 |
| Comparative Example 4 | 15/17 |

Referring to FIG. 9, the separators according to the examples exhibited no shrinkage, but the separators according to the comparative examples exhibited a shrinkage.

Specifically, referring to Table 4, the separators according to the examples exhibited a heat shrinkage rate of less than or equal to 5%, but the separators according to the comparative examples exhibited a heat shrinkage rate of greater than or equal to 10% and up to 50%.

For example, the separator including inorganic particles having an average particle diameter of 1.0 μm according to Comparative Example 2 had a low coating layer packing density and a reduced contact area among the particles, compared with that of the particles, and thus exhibited a deteriorated binding force between a heat-resistant binder and the inorganic particles and resultantly, greatly deteriorated heat resistance.

In summary, the separators according to the examples included a heat-resistant binder including a (meth)acrylic copolymer including a specific structural unit, inorganic particles, and an adhesive binder and thus exhibited excellent adhesive strength to the substrate and/or heat resistance and a shrinkage rate of less than 10% at 150° C. and thus, realized excellent heat resistance and adhesion characteristics.

While this invention has been described in connection with what is presently considered to be practical example embodiments, it is to be understood that the invention is not limited to the disclosed embodiments. On the contrary, it is intended to cover various modifications and equivalent arrangements included within the spirit and scope of the appended claims.

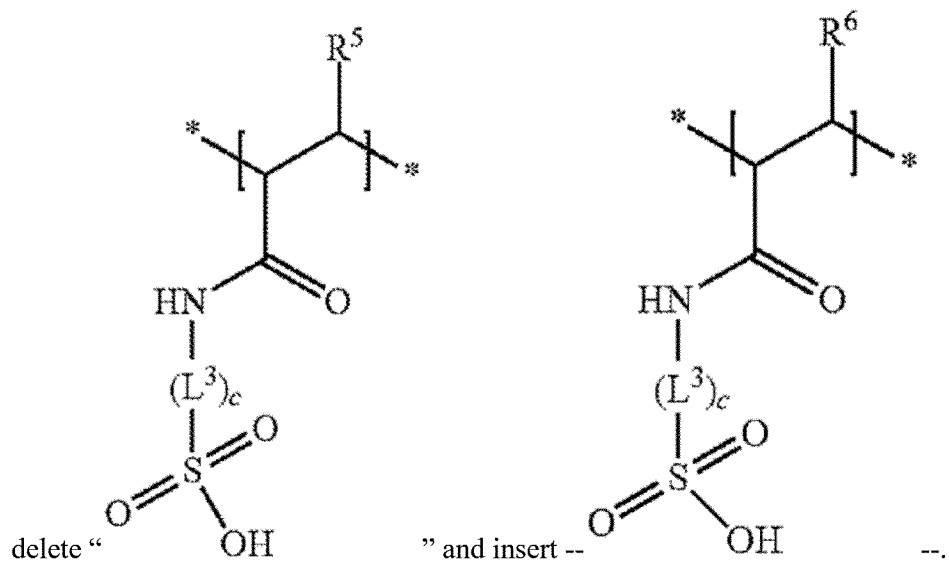

The invention claimed is:

1. A separator for a lithium secondary battery, comprising a porous substrate, and
a coating layer on at least one surface of the porous substrate,
wherein the coating layer includes a heat-resistant binder including a (meth) acrylic copolymer including a first structural unit derived from (meth) acrylamide, and a second structural unit including a structural unit derived from (meth) acrylic acid or (meth) acrylate, and/or including a structural unit derived from (meth) acrylamidosulfonic acid or a salt thereof;
an adhesive binder having a core-shell structure; and
inorganic particles,
wherein the adhesive binder has an average particle diameter of 0.2 μm to 1.0 μm, and
the inorganic particles have an average particle diameter of 0.2 μm to 1.0 μm, wherein
the coating layer includes
a heat-resistant layer on the porous substrate, and
an adhesive layer on the heat-resistant layer,
wherein the heat-resistant binder is included in the heat-resistant layer, and
the adhesive binder is included in the adhesive layer and the adhesive layer does not include the heat-resistant binder.

2. The separator of claim 1, wherein the adhesive binder is a (meth) acrylic polymer including a structural unit derived from (meth) acrylic acid or (meth) acrylate and a structural unit derived from a monomer including a polymerizable unsaturated group.

3. The separator of claim 2, wherein the monomer containing the polymerizable unsaturated group is at least one selected from a styrene-based monomer, an acid-derived monomer, and a combination thereof.

4. The separator of claim 3, wherein the acid-derived monomer is at least one selected from itaconic acid, (meth) acrylic acid, and a combination thereof.

5. The separator of claim 1, wherein the adhesive binder is included in an amount of 1 to 20 wt % based on the total amount of the coating layer.

6. The separator of claim 1, wherein a weight ratio of the heat-resistant binder including the (meth) acrylic copolymer: the inorganic particles is 1:20 to 1:40.

7. The separator of claim 1, wherein
the thickness of the heat-resistant layer is 1 μm to 5 μm, and
the thickness of the adhesive layer is 0.4 μm to 1.4 μm.

8. The separator of claim 1, wherein
the coating layer further comprises an organic filler, and
the organic filler is included in at least one layer of the heat-resistant layer and the adhesive layer.

9. The separator of claim 8, wherein the organic filler has an average particle diameter of 120 nm to 500 nm.

10. The separator of claim 8, wherein the inorganic particles: the adhesive binder and the organic filler have a volume ratio of 33:1 to 1:1.

11. The separator of claim 1, wherein the first structural unit is included in an amount of 55 mol % to 95 mol % based on 100 mol % of the (meth) acrylic copolymer and the second structural unit is included in an amount of 5 mol % to 45 mol % based on 100 mol % of the (meth) acrylic copolymer.

12. The separator of claim 1, wherein the structural unit derived from (meth) acrylic acid or (meth) acrylate is included in an amount of 0 to 40 mol % based on 100 mol % of the (meth) acrylic copolymer and the structural unit derived from (meth) acrylamidosulfonic acid or a salt thereof is included in an amount of 0 to 10 mol % based on 100 mol % of the (meth) acrylic copolymer.

13. The separator of claim 1, wherein the structural unit derived from the (meth) acrylamide is included in an amount of 80 mol % to 90 mol % based on 100 mol % of the (meth) acrylic copolymer, the structural unit derived from (meth) acrylic acid or (meth) acrylate is included in an amount of 0 to 10 mol % based on 100 mol % of the (meth) acrylic copolymer, and the structural unit derived from (meth) acrylamidosulfonic acid or a salt thereof is included in an amount of 0 to 10 mol % based on 100 mol % of the (meth) acrylic copolymer.

14. The separator of claim 1, wherein
the first structural unit derived from (meth) acrylamide is represented by Chemical Formula 1, and
the structural unit derived from (meth) acrylic acid or (meth) acrylate is represented by one of Chemical Formula 2, Chemical Formula 3, and a combination thereof, and
the structural unit derived from (meth) acrylamidosulfonic acid or a salt thereof is represented by one of Chemical Formula 4, Chemical Formula 5, Chemical Formula 6, and a combination thereof:

[Chemical Formula 1]

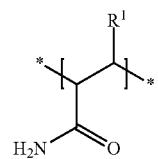

[Chemical Formula 2]

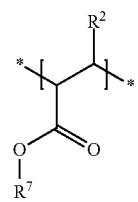

[Chemical Formula 3]

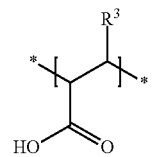

[Chemical Formula 4]

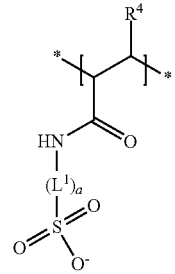

[Chemical Formula 5]

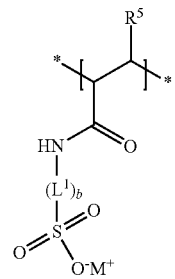

[Chemical Formula 6]

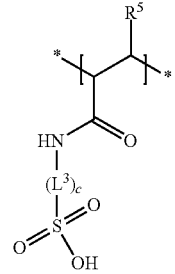

wherein, in Chemical Formula 1 to Chemical Formula 6,
$R^1$ to $R^6$ are each independently hydrogen or a C1 to C6 alkyl group,
$R^7$ is a substituted or unsubstituted C1 to C20 alkyl group,
$L^1$ to $L^3$ are each independently a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 heterocyclic group,
a, b, and c are each independently one of integers of 0 to 2, and
M is an alkali metal.

15. A lithium secondary battery, comprising
a positive electrode, a negative electrode, and the separator for lithium secondary battery of claim 1 between the positive electrode and the negative electrode.

* * * * *

UNITED STATES PATENT AND TRADEMARK OFFICE
CERTIFICATE OF CORRECTION

PATENT NO. : 12,237,536 B2
APPLICATION NO. : 17/296516
DATED : February 25, 2025
INVENTOR(S) : Yongkyoung Kim et al.

It is certified that error appears in the above-identified patent and that said Letters Patent is hereby corrected as shown below:

In the Claims

In Column 24, Line 56, in Claim 1, delete "(meth) acrylic" and insert -- (meth)acrylic --.

In Column 24, Line 57, in Claim 1, delete "(meth) acrylamide," and insert -- (meth)acrylamide, --.

In Column 24, Line 59, in Claim 1, delete "(meth) acrylic" and insert -- (meth)acrylic --.

In Column 24, Line 59, in Claim 1, delete "(meth) acrylate," and insert -- (meth)acrylate, --.

In Column 24, Lines 60-61, in Claim 1, delete "(meth) acrylamidosulfonic" and insert -- (meth)acrylamidosulfonic --.

In Column 25, Line 11, in Claim 2, delete "(meth) acrylic" and insert -- (meth)acrylic --.

In Column 25, Line 12, in Claim 2, delete "(meth) acrylic" and insert -- (meth)acrylic --.

In Column 25, Line 12, in Claim 2, delete "(meth) acrylate" and insert -- (meth)acrylate --.

In Column 25, Lines 21-22, in Claim 4, delete "(meth) acrylic" and insert -- (meth)acrylic --.

In Column 25, Line 27, in Claim 6, delete "(meth) acrylic" and insert -- (meth)acrylic --.

In Column 25, Line 44, in Claim 11, delete "(meth) acrylic" and insert -- (meth)acrylic --.

In Column 25, Line 46, in Claim 11, delete "(meth) acrylic" and insert -- (meth)acrylic --.

In Column 25, Line 49, in Claim 12, delete "(meth) acrylic" and insert -- (meth)acrylic --.

In Column 25, Line 49, in Claim 12, delete "(meth) acrylate" and insert -- (meth)acrylate --.

Signed and Sealed this
Third Day of June, 2025

Coke Morgan Stewart
*Acting Director of the United States Patent and Trademark Office*

In Column 25, Line 51, in Claim 12, delete "(meth) acrylic" and insert -- (meth)acrylic --.

In Column 25, Line 52, in Claim 12, delete "(meth) acrylamidosulfonic" and insert
-- (meth)acrylamidosulfonic --.

In Column 25, Line 54, in Claim 12, delete "(meth) acrylic" and insert -- (meth)acrylic --.

In Column 25, Line 56, in Claim 13, delete "(meth) acrylamide" and insert -- (meth)acrylamide --.

In Column 25, Lines 57-58, in Claim 13, delete "(meth) acrylic" and insert -- (meth)acrylic --.

In Column 25, Lines 58-59, in Claim 13, delete "(meth) acrylic" and insert -- (meth)acrylic --.

In Column 25, Line 59, in Claim 13, delete "(meth) acrylate" and insert -- (meth)acrylate --.

In Column 25, Line 60, in Claim 13, delete "(meth) acrylic" and insert -- (meth)acrylic --.

In Column 25, Lines 61-62, in Claim 13, delete "(meth) acrylamidosulfonic" and insert
-- (meth)acrylamidosulfonic --.

In Column 25, Lines 63-64, in Claim 13, delete "(meth) acrylic" and insert -- (meth)acrylic --.

In Column 25, Line 66, in Claim 14, delete "(meth) acrylamide" and insert -- (meth)acrylamide --.

In Column 26, Line 1, in Claim 14, delete "(meth) acrylic" and insert -- (meth)acrylic --.

In Column 26, Line 2, in Claim 14, delete "(meth) acrylate" and insert -- (meth)acrylate --.

In Column 26, Lines 5-6, in Claim 14, delete "(meth) acrylamidosulfonic" and insert
-- (meth)acrylamidosulfonic --.

In Column 26, Lines 44-54, in Claim 14, Chemical Formula 5,

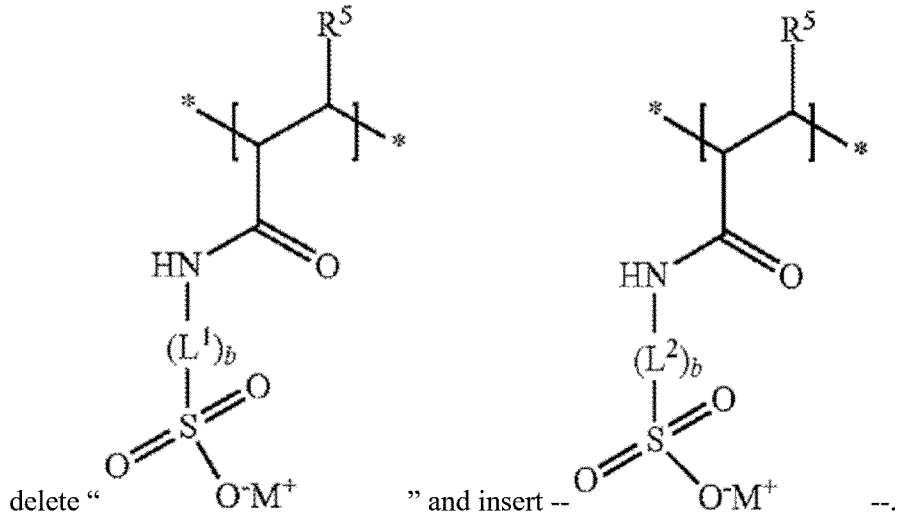

CERTIFICATE OF CORRECTION (continued)
U.S. Pat. No. 12,237,536 B2

In Column 26, Lines 55-65, in Claim 14, Chemical Formula 6,